(12) United States Patent
Kato et al.

(10) Patent No.: US 8,510,572 B2
(45) Date of Patent: Aug. 13, 2013

(54) REMOTE ACCESS SYSTEM, GATEWAY, CLIENT DEVICE, PROGRAM, AND STORAGE MEDIUM

(75) Inventors: Takatoshi Kato, Kawasaki (JP); Nagamasa Mizushima, Kawasaki (JP); Takashi Tsunehiro, Kawasaki (JP); Makoto Kayashima, Kawasaki (JP); Kazushi Nakagawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 713 days.

(21) Appl. No.: 11/979,123

(22) Filed: Oct. 31, 2007

(65) Prior Publication Data
US 2008/0133937 A1 Jun. 5, 2008

Related U.S. Application Data

(63) Continuation of application No. 10/566,943, filed as application No. PCT/JP2005/000698 on Jan. 20, 2005.

(30) Foreign Application Priority Data

Jan. 21, 2004 (JP) ................................. 2004-012594
Apr. 13, 2004 (JP) ................................. 2004-117437

(51) Int. Cl.
*G06F 7/04* (2006.01)
(52) U.S. Cl.
USPC ............................................. 713/193; 726/27
(58) Field of Classification Search
USPC ...... 713/159, 168–171, 189–193; 726/27–30
See application file for complete search history.

(56) References Cited

U.S. PATENT DOCUMENTS 5,265,163 A 11/1993 Golding et al.
5,652,892 A 7/1997 Ugajin
(Continued)

FOREIGN PATENT DOCUMENTS

JP 2001-209773 8/2001
JP 2002-158650 5/2002
(Continued)

OTHER PUBLICATIONS

English translation of Korean Notice of Preliminary Rejection issued in Korean Patent Application No. KR 10-2006-7001743 dated on Jul. 30, 2007.
(Continued)

*Primary Examiner* — Eleni Shiferaw
*Assistant Examiner* — Phy Anh Vu
(74) *Attorney, Agent, or Firm* — McDermott Will & Emery LLP

(57) ABSTRACT

Disclosed is a secure remote access system for improving convenience of a user by utilizing a storage device including an anti-tampering device as a user authentication device in the secure remote access system for making access and execution of job while a user is making the encrypted communication to a server from an unspecified client. Usability can be improved and thereby the job executing function can be used smoothly at the internal and external sides of the working office by providing a server client system where the server can be manipulated remotely by distributing a storage device loading the authorized anti-tampering device to users, connecting the storage device to unspecified clients by users, and using the authentication information and application stored in the storage device. A remote access system having improved security and convenient during usage of client from the user can also be provided by reducing the secret information remaining in the manipulated client.

12 Claims, 18 Drawing Sheets

(56) References Cited

U.S. PATENT DOCUMENTS

| | | | |
|---|---|---|---|
| 5,892,902 A * | 4/1999 | Clark | 726/5 |
| 6,088,794 A | 7/2000 | Yoon et al. | |
| 6,876,747 B1 * | 4/2005 | Faccin et al. | 380/247 |
| 6,895,502 B1 | 5/2005 | Fraser | |
| 6,915,420 B2 * | 7/2005 | Hensley | 713/2 |
| 6,920,221 B1 * | 7/2005 | Faber et al. | 380/200 |
| 6,920,561 B1 | 7/2005 | Gould et al. | |
| 7,190,793 B2 * | 3/2007 | Hsu | 380/270 |
| 7,360,073 B1 * | 4/2008 | Billstrom et al. | 713/2 |
| 7,370,200 B2 * | 5/2008 | Kindberg et al. | 713/168 |
| 7,382,882 B1 * | 6/2008 | Immonen | 380/270 |
| 7,522,728 B1 * | 4/2009 | Rhoads | 380/270 |
| 2003/0040929 A1 | 2/2003 | Knegendorf et al. | |
| 2004/0124246 A1 | 7/2004 | Allen et al. | |
| 2005/0160251 A1 | 7/2005 | Zur et al. | |

FOREIGN PATENT DOCUMENTS

| | | |
|---|---|---|
| JP | 2002-229861 | 8/2002 |
| JP | 2003-108385 | 4/2003 |
| JP | 2003-337749 | 11/2003 |
| KR | 10-2001-0088530 | 9/2001 |
| KR | 10-2003-0049387 | 6/2003 |
| KR | 10-2003-0052002 | 6/2003 |
| KR | 2003-0049387 | 6/2003 |
| KR | 2003-0052002 | 6/2003 |
| KR | 10-2003-0060342 | 7/2003 |
| KR | 2003-0060342 | 7/2003 |

OTHER PUBLICATIONS

Korean Office Action issued in Korean Patent Application No. 10-2007-7025337, dated on Jan. 25, 2008.
Korean Office Action issued in Korean Patent Application No. KR 10-2007-7025337 dated on Aug. 29, 2008.
Miyake, J., et al. "Secure MultiMediaCard for Content Distribution and Mobile Commerce" Hitachi Hyoron, Hitachi Hyoronsha, 2001 Nen 10 Gatsu Special Extra Issue, Oct. 2001, pp. 9-14.
Chiba, S., et al. "Constructing Personal Network on the Internet" Information Processing Society of Japan Kenkyu Hokoku, vol. 2001, No. 78, Jul. 2001, pp. 83-90.
Kato, T., et al. "A Secure Flash Card Solution for Remote Access for Mobile Workforce" IEEE Transactions on Consumer Electronics, vol. 49, No. 3, Aug. 2003, pp. 561-566.
Korean Office Action issued in Korean Patent Application No. KR 10-2006-7001743, dated Jul. 30, 2007.
English translation of Korean Office Action issued in Korean Patent Application No. KR 10-2007-7025337 dated on Aug. 29, 2008.
United States Office Action issued in U.S. Appl. No. 10/566,943 dated on Nov. 25, 2008.
United States Office Action issued in U.S. Appl. No. 10/566,943 dated Dec. 7, 2009.
United States Office Action issued in U.S. Appl. No. 10/566,943, mailed Aug. 16, 2010.
United States Notice of Allowance issued in U.S. Appl. No. 10/566,943 dated Apr. 28, 2011.

* cited by examiner

REMOTE ACCESS SYSTEM, GATEWAY, CLIENT DEVICE, PROGRAM, AND STORAGE MEDIUM

INCORPORATION BY REFERENCE

This application is a Continuation of U.S. Ser. No. 10/566,943, filed Feb. 3, 2006, which is a U.S. National Phase of International Application No. PCT/JP2005/000698, filed Jan. 20, 2005, claiming priority from Japanese Patent Application Nos. 2004-012594 filed on Jan. 21, 2004, and 2004-117437 filed on Apr. 13, 2004, the entire disclosures of which are incorporated herein by reference.

TECHNICAL FIELD

The present invention relates to a secure remote access system for safely enabling remote manipulations of server through a network. Particularly, the present invention relates to an anti-tampering device and a program to be recorded on the client or anti-tampering device, for adequately connecting a client to the server, and a network connection technology for operating a remote access system.

BACKGROUND ART

With continuous reduction in the price of a personal computer (PC) and a network device in recent years, a terminal which is used for business such as PC is distributed to a greater part of the employees for the actual works in the company. When the price of PC is lowered and such low price PC is widely used for business in the company, the number of PCs which require the maintenance work by the apparatus administrators in the company is also increasing proportionally. Such maintenance work includes, for example, update of version of operating system (OS) and job application, fixing of bugs, countermeasure for hardware fault and virus, and extermination of virus, or the like. A management cost of such maintenance work is very high and becomes remarkable in proportion to increase in the number of employees.

As a means for reducing such management cost, a system operation method which is called a server-client system has been employed. In this method, the principal programs and data are accumulated in the side of server, and the data to be accumulated in the side of client, for example, such as Thin Client is reduced.

Since arithmetic process and accumulation of data are mainly performed in the server side in the server client system, necessity and frequency of update of version, fixing of bugs, countermeasure for virus, and extermination of virus of applications used individually for OS and jobs in the client side such as the thin client are reduced, the total management cost can be lowered.

Moreover, in these years, attention is paid to an IC card (called a smart-card) including therein a processor called an IC chip as a key device having the electronic authenticating function. The IC card means a card including a central processing unit (CPU) within an internal IC card module. As a memory of the IC card, ROM, EEPROM or the like are used. Since the IC card has the arithmetic function therein, the IC card itself can determine whether the access is made from an authorized user or not when the write or read operation is instructed from a host apparatus. Moreover, since forgery of the CPU itself is difficult, tampering of information issued from an IC card module (IC card chip) as an anti-tampering device and illegal access to the internal side of the IC card module are difficult. Therefore, a system having higher security level can be formed. Many IC cards can be controlled to adequately output or not to output the information thereof to a reader/writer or to a host by collation between the registered personal identification number (PIN) of a user and the PIN stored within the card. The IC card is provided, therein, with an electronically erasable and programmable memory such as EEPROM and RAM in order to store the applications and information of a user and a card provider. The IC card is capable of authenticating a card owner and outputting the information for preventing denial by outputting the information which only the card owner knows or generates to the external side of card by conducting the arithmetic operation using the information (secret key or the like) which can be stored only in said card for the information inputted from the external side.

Moreover, a flash memory card is a memory card including a non-volatile memory module which can store therein the information of a user. Many flash memory cards do not have "hardware resistivity against attack from a third party" (anti-tampering property). The flash memory card having no anti-tampering property is de-assembled when it is subjected to robbery or missing or the like and the information stored can easily be leaked to a third party through analysis of memory in the card or controller.

Moreover, as described in JP-A-2001-209773, a flash memory interface and a flash memory card having the IC card function are disclosed. The flash memory interface and flash memory card having the IC card function are conveniently capable of carrying the stored document and setting file or the like of the user established within a personal computer and a work station by storing within the card because of its size in the memory capacity thereof.

DISCLOSURE OF THE INVENTION

In the server client system explained above, authentication and exchange of data between the server and the client are conducted via the network. Therefore, at the time of making access to the server from a client on the network, it is required in the server side to verify whether the access is made from the authorized client or not and to also verify whether a user who is using the client is the authorized user or not. Moreover, the desired job cannot be conducted in the client side if the server being accessed cannot be detected as the authorized server. If such verification is not conducted, the data accumulated in the server side and the information of the user are likely to be leaked to a third party. Therefore, the security such as authentication on the network and encryption of the transmitting information during execution of job must be enhanced sufficiently.

An object of the present invention is to improve convenience of a user with a server client system, in which a storage device such as a flash memory card, which can store the authentication information of a user into the authorized anti-tampering device such as the IC chip mounted into an IC card and safely store the files of large capacity for transportation, is used as an authentication device.

Moreover, it is also an object of the present invention to provide a storage device for authentication which may be used in the server client system thereof.

The aforementioned and the other novel characteristics of the present invention will become apparent from the description and the appended drawings of this specification of the present invention.

Summary of the typical inventions among those disclosed in this specification will be explained below. Namely, in order to achieve the objects explained above, the remote access system of the present invention is characterized in including a storage device having the functions of an anti-tampering device and a controller, a reader/writer for connecting the storage device, a client for connecting the reader/writer, a server which is operated through remote manipulation from the client via the network, and a gateway for encrypted communication on the network, in which an application for remote manipulation of the server and an encrypted application for encrypting communication on the network are stored in the storage and the authentication information for encrypted communication of the gateway and client is stored in the anti-tampering device.

According to a profile of the present invention, flexibility in use of users can be improved by distributing a storage device mounting the authorized anti-tampering device to users, connecting the storage device to unspecified clients from users, and providing the server client system for remote manipulation of servers using the authentication information and application within the storage device. As a result, the remote access system which can improve security and convenience while users are using client can be provided by smoothly using the job executing function in the internal and external sides of the business offices and then reducing secret information remaining within the manipulated client.

BEST MODE FOR CARRYING OUT THE INVENTION

The preferred embodiments of the present invention will be explained in detail with reference to the accompanying drawings. The elements designated with the same reference numerals in the drawings indicate the same structural elements having the same functions. Therefore, detail explanation of such elements will be omitted in this specification for simplifying the explanation.

(First Embodiment)

A first embodiment of the secure remote access system of the present invention will be explained with reference to FIG. 1 to FIG. 7.

FIG. 1 is a diagram illustrating a remote access system as a first embodiment of the present invention.

A server 1000 used by users and a plurality of clients (client 1001 and client 1002) are connected to a network 1006 via network cables 1003, 1004, and 1005. The network cables 1003, 1004, and 1005 and a network 1006 are adequately connected with a network hub and a switch not illustrated and the packets to the connected devices on the network cables 1003, 1004, 1005 and network 1006 are adequately routed and thereby these are in the state which is ready for normal communication. The server 1000 is connected with a display 1007 through a display interface not illustrated. Similarly, the clients 1001 and 1002 are also connected respectively to the displays 1008 and 1009 via the display interface not illustrated. The clients 1001 and 1002 are respectively connected with user interfaces 1010 and 1011. The user interfaces 1010 and 1011 have the functions to transmit the input information of users of the clients 1001 and 1002 which are respectively formed of a keyboard, a mouse, a track ball, a touch panel, a touch pad, a finger print reader, and a biological body information reader or the like.

The readers/writers 1012, 1013 are respectively connected with clients 1001, 1002 and have the functions to insert the storage device 1014. A terminal 2000 explained later within the storage device 1014 is connected with a terminal not illustrated of the reader/writer 1012 for making communication with the client 1001. The storage device 1014 is designed to be carried with a user and to be utilized in a device, for example, in the client 1002.

The storage device 1014 mounts therein the controller 1015, anti-tampering device 1016, and storage 1017. The controller 1015, anti-tampering device 1016 and storage 1017 are described to be mounted as individual integrated circuits but may also be mounted as an integrated circuit having the similar functions. The anti-tampering device 1016 is the device having the anti-tampering property in the level which is authorized or may be authorized in accordance with the standards specified by the security evaluation organization, for example, such as the IC card chip.

Within the server 1000, the CPU 1030, memory 1031, storage 1032 are mounted. The client 1001 mounts the CPU 3000, memory 3001, and storage 3002, while the client 1002 mounts the CPU 1050, memory 1051, and storage 1052.

The result obtained by execution in the CPU 1030 is usually displayed on the display 1007. However, when the connection for requesting the server/client type process is extended to the server 1000 from the client 1001, authentication is thereby set up, and the encrypted communication by the remote manipulation between the server 1000 and the client 1001 is established, the process result after execution of the program on the server 1000 via the client 1001 is displayed on the display 1008. In this case, the information displayed on the display 1008 is displayed with the identical display method as the information displayed on the display 1007. Accordingly, a user feels in the identical manner as if the user was utilizing both client 1001 and user interface 1010 and thus the user were directly manipulating the server 1000. This can enhance usability.

FIG. 2 is a block diagram illustrating the details of the storage device 1014. The storage device 1014 mounts the terminal 2000, controller 1015, anti-tampering device 1016 and storage 1017, which are connected as illustrated in the figure. The controller 1015 is provided therein with the CPU 2001, memory 2002, non-volatile memory 2003, and interfaces (I/F) 2004, 2005, 2006. The storage 1017 is a non-volatile storage medium such as hard disk, EEPROM, MRAM, MO, and optical disk. In this embodiment, the explanation will be developed under the precondition that the storage 1017 is a flash memory but it may be the other type of storage medium.

The CPU 2001 within the controller 1015 executes the application loaded to the memory 2002 from the non-volatile memory 2003 and performs communication management among the anti-tampering device 1016, terminal 2000, and storage 1017 such as file management of storage 1017, reset and control of the anti-tampering device 1016 via the interfaces (I/F) 2004 to 2006.

The non-volatile memory 2003 stores the public key arithmetic program 2050, common key arithmetic program 2051, and file management program 2052 in the storage 1017. Moreover, the non-volatile memory 2003 may have programs for conducting hash arithmetic operation, digital signature, verification of certificate, and generation of key or the like.

The anti-tampering device 1016 includes therein the CPU 2030, memory 2031, and storage 2032. The coprocessor 2033 complements the encrypting function among the arithmetic functions of the CPU 2030. However, when the CPU 2030 assures high-speed calculation rate, mounting of this coprocessor 2033 is no longer required. The CPU 2030 has the functions to execute the application loaded to the memory 2031 from the storage 2032 and to perform encryption and decryption with the common key, encryption and decryption with the non-symmetrical key, file management in the storage 2032, hash arithmetic operation, digital signature, verification of certificate, and generation of key or the like. The anti-tampering device 1016 has the anti-tampering property which is sufficiently resistive to various attacks such as voltage variation and is in the level which is authorized or may be authorized by the standards specified by the security evaluation organization.

The storage 2032 is the non-volatile storage such as EEPROM, MRAM, and flash memory. The storage 2032 stores therein the secret key 2040, PIN information 2041, log information 2042, certificate 2043, public key 2044, PIN verification program 2045, key certificate storing program 2046, public key arithmetic program 2047, common key arithmetic program 2048, and key generating program 2049. One or a plurality of programs may be stored. Data and programs in the storage 2032 are loaded to the memory 2031 to operate the CPU 2030 or transmitted to the external side of the anti-tampering device 1016 via the controller 1015.

The secret key 2040 is used for authenticating users and encrypting the communication channel. One or a plurality of secret keys may be used. The secret key 2040 is described in the format which is different in accordance with a kind of the corresponding key algorithm. Aggregation of the public key corresponding to a secret key within the secret key 2040 is the public key 2044 and aggregation of the corresponding certificates is the certificate 2043. The certificate 2043 is the certificate of the public key 2044 corresponding to the secret key 2040 and has been issued from the server 1000 or from an external certification authority. Moreover, the certificate 2043 also includes the other certificate information of the certificates of the root certification authority and intermediate certification authority within the authentication period in which the certificate of the public key 2044 and the other certificates are issued. The format of certificate 2043 satisfies, for example, the specifications of X.509 specified by the ITU (International Telecommunication Unity). The information stored in the certificate 2040 includes, for example, in addition to the items of public key and the signature for the public key, the items of version number of certificate, the serial number of certificate, information of public key of a user, information of certification authority having issued the certificate, the valid term of the certificate, information of a user such as name, an electronic mail address, and expanded region. The certificate 2010 is used for verification of authentication information and encryption of data and session key or the like within the clients 1001, 1002, and server 1000 from within the card.

The PIN information 2041 is used to verify the right of the user who is causing the anti-tampering device 1016 to output, from the external side thereof, the information within the same anti-tampering device 1016 and to execute the arithmetic operation. The PIN information 2041 may be a PIN, a longer character string having the longer number of digits which is called a path phrase, or a biological authentication information which becomes a ground of biological authentication based on the finger print, iris, shape of face, voiceprint, and vein or the like.

The log information 2042 is generated by recording usage history of the anti-tampering device 1016. This log information allows addition of data whenever the CPU 3000 or 2001 or 2030 operates and also allows addition of data by a user having an adequate right from the external side of the anti-tampering device 1016, and can also be read out. The log information 2042 can be recorded with addition of the signature of hash value in order to prevent tampering by a third party.

The PIN verification program 2045 can verify whether the PIN information 2041 is matched with the PIN information inputted for verification from the external side of the anti-tampering device 1016. When verification result is correct, the anti-tampering device 1016 brings users to the state enabling use of the internal information and arithmetic operation resources. The PIN verification program 2045 determines usage right for individual authentication for each program stored in the storage 2032 and loaded to the memory 2031 and each information stored in the storage 2032. For example, for the users who are legally determined correct once with the PIN verification program after use of the anti-tampering device of which power supply has been turned ON, setting can be made not to request the PIN verification with the subsequent access or to execute the PIN verification for each use of the anti-tampering device.

The key certificate storing program 2046 has the functions to output the secret key 2040, public key 2044, and certificate 2043 stored in the storage 2032 to the external side of the anti-tampering storage device 1016 and to store these within the storage 2032 by fetching them to the internal side from the external side of the same anti-tampering storage device 1016. In order to use the key certificate storing program 2046, verification by the PIN verification program 2045 must be completed. However, if only output of the certificate 2043 and public key 2044 is requested, verification by the PIN verification program 2045 is no longer required. The key certificate storing program 2046 has the function to exchange the keys and certificates by providing the safe encrypted communication channel through exchange of the external CPU 3000 or 2001 or 2030 with the session key when the keys and certificates are inputted and outputted from and to the external side.

The public key arithmetic program 2047 and common key arithmetic program 2048 respectively have the functions which are similar to that of the public key arithmetic program 2050 and common key arithmetic program 2051. The key generating program 2049 has the function to generate a secret key (common key) or a pair of keys consisting of both the secret key 2040 and public key 2044. The public key and the common key generated are stored within the storage 2032 or outputted to the outside thereof. The secret key of asymmetrical key is stored within the secret key 2040.

The storage 1017 records therein the certificate 2010 for identifying a user, log information 2011 obtained with manipulation by a user using the storage device 1014, the library for device access 2012, the program 2013 for device management, the device driver 2014, the interface handler 2015, the installer 2016, the application 2017 for remote manipulation terminal, the application 2018 for constituting encrypted communication channel, the job application 2019, the temporary storage region 2020, and copy of authentication information 2021.

The certificate 2010 is used by the client 1001 and server 1000 for conducting arithmetic operation to identify the user and the storage device 1014. The format of the certificate 2010 is enough when it satisfies the specifications of X.509 specified by the ITU. In the certificate 2010, for example, the version number of certificate, the serial number of certificate, public key information of a user, information of certification authority having issued the certificate, the term of validity of certificate, user or storage device information such as name, an electronic mail address and an inherent identification number of the storage device, and expanded region. The certificate 2010 is used, in the storage device, 1014, client 1001, and server 1000, for verification of authentication information and encryption of data and session or the like.

The log information 2011 is updated, when the user has conducted manipulation using the storage device 1014, with instruction of the CPU 2001, or CPU 2030, or client 1001, or server 1000. This log information 2011 is used by the application on the server 1000 and application on the client 1001 or by the user to confirm usage condition thereof. The log information 2011 is recorded with addition of the signature of the hash value in view of preventing tampering by a third party.

The library 2012 for device access is formed as a function group to use the functions such as file management, arithmetic operation of hash, digital signature, verification of certificate, and generation of key which is used by a plurality of applications operating in the client 1001 for making access to the storage 1017. Usually, this library is installed for use into the client 1001 with the installer 2016 but the library 2012 for device access may also be used in direct from the application on the client 1001.

The tool 2013 for device management is used for management of storage device 1014. For example, this tool 2013 includes a tool for updating authentication number of users, a tool for initializing the locked storage device, a tool for updating program and firmware on the storage device, key information, and certificate, a monitoring tool for debug which is required for debugging the storage device 1014, and a tool for power supply management for remotely turning ON and OFF the power supply of the client 1001 and server 1000 by utilizing the manual of storage device, help file and the function such as Wake up on LAN for turning ON the power supply of server from the distant area. The tool 2013 for device management may be installed to the client 1001 from the installer 2015 which will be explained later or may also be used through direct loading by users to the client 1001.

The device driver 2014 is a program for providing the OS with information which is necessary for operations of the storage device 1014 and for operation management. This driver 2014 is installed with the installer 1015 to the client 1001.

The interface handler 2015 is a middleware for management of the device driver 2014 and has the role of connecting the application operating on the client 1001 and server 1000 to the device driver 2014.

The installer 2016 is used by users to install the application, information, driver or the like existing on the storage 1017 to the client 1001 and server 1000. The application and the driver or the like installed with the installer 2016 may be deleted from the storage device 1017 after the installation is completed, but they may be stored on the storage device 1017 for using the storage device 1014 through connection to the other device by the users.

The application 2017 for a remote manipulation terminal is used for remote manipulation of server 1000 from the client 1001. The application 2017 for a remote manipulation terminal may be the standard service and application included in the OS of the client 1001 and server 1000 such as the terminal service and remote desk-top. This application 2017 for a remote manipulation terminal may be installed for use into the client 1001 with the installer 2016 or may be used through direct loading to the client 1001 from the storage device 1014.

The application 2018 for constituting an encrypted communication channel is used for encrypting communications between the client 1001 and server 1000. This application 2018 for constituting an encrypted communication channel establishes the encrypted communication channel between the server 1000 and the client 1001 by providing the common secret key between the server 1000 and the client 1001 and then using such common secret key. For common use of this secret key, the secret information of the secret key or the like within the anti-tampering device 1016 may be used and authentication using the secret information within the anti-tampering device 1016 may also be utilized within the processes using in common the secret key.

The job application 2019 is used when a user utilizes the client 1001. This job application 2019 is a web browser when a web-based application on the server, for example, is used or a client for database manipulation when a database is used. All pieces of information on the storage 1017 may be recorded through encryption with several secret keys 2040 among those within the anti-tampering device 1016 or with several keys 2040 among those held on the client 1001, or may be recorded in the ordinary sentence. In the former case, security provided to users can be improved. Moreover, when access to the storage 1017 is impossible if the user authentication is not yet completed in the controller 1015 and anti-tampering device 1016, security provided to the users can be improved.

The temporary storage area 2020 is used to store a temporary file generated by the application when the application such as job application 2019 is executed on the client 1001. The job application 2019 and the application for executing jobs on the server 1000 or the client 1001 are used to generate the temporary storage file such as bit map cache into the temporary storage area 2020. If the temporary storage area is not encrypted, the temporary storage file is erased with instruction of the OS or application on the controller 1015 or client 1001 when a user stops utilization. Accordingly, the temporary file generated by a user is stored on the storage device, the information used by a user is protected safely even if the information in the client 1001 is exposed to risk by a third party, and the secret information of a user from the client 1001 in which the power supply is turned OFF and the information including privacy are not longer leaked easily.

FIG. 12 illustrates a flowchart of the processing method for utilizing the temporary storage area 2020 from the application installed to the job application 2019 and the client 1001 recorded on the storage 1017. The processes illustrated in the flowchart of FIG. 12 are conducted in the CPU 1030 or 3000 in which the applications are executed. For example, the application 2017 for a remote manipulation terminal and job application 2019 are executed on the CPU 3000, while the application on the server 1000 is executed on the CPU 1030. In this case, when the application used by a user is driven (12000), whether temporary storage area 2020 is defined or not in the application used by a user is driven (12000), whether temporary storage area 2020 is defined or not in the application and whether it can be used or not are searched (12001). When such temporary storage area 2020 is not yet defined or is not available in the process 12001, the area of the temporary storage area 2020 is defined and is set as the available area (12002). Next, the capacity of the temporary storage area and availability thereof are checked (12004). Assuming that such a problem as insufficient capacity is detected, the process is continued when the problem of insufficient capacity is solved (12005) and the application can be recovered from the irregular state (12006). However, if not, the application is completed irregularly (12007). Next, process of application is started (12003) and data is inputted and outputted to and from the temporary storage area 2020 (12008). In the case where the process of application is continued, the process goes back to the step 12004. When the application is completed, input/output is conducted (12010) to and from the temporary storage area 2020. In the step 12010, the information using the application is erased and checked. Since the information used by a user is adequately held or erased in many cases in the step 12010, the information including privacy of a user and the secret information can be protected. When irregularity is not detected, the application is completed (12011).

In a certain application, several defining method are provided for the temporary storage area 2020. In one method, in the timing that the application is driven, the area of the temporary storage area 2020 is identified with the application when the application reads the setting of a certain temporary storage area described in the user profile provided on the client 1001 for each user. In this case, the user profile is recorded in the storage 3002 or storage 1017 with the setting information of a user defined with the OS or application. In another method, in the timing that the application is driven, the OS or application urges the user to execute the input by displaying the checking means such as a dialogue on the display 1008 to the user in view of identifying setting of the temporary storage area with the application. This checking means is often effectuated at the time of first drive of the application but it may be effectuated in each time of drive. With any of the methods explained above, the application sets the temporary storage area corresponding to the user's usage environment. The information which is once defined by the user may be used again with the application when the application is driven by recording the information to the storage 3002 or storage 1017 on the client.

The copy of authentication information 2021 is a copy of the public key 2044, certificate 2043 and PIN information 2041 or the like within the anti-tampering device 1016.

FIG. 3 illustrates an example of the copy of authentication information 2021. The certificate 1 (5001) to certificate N (5003) are part of the certificate 2043. The authentication information 5004 of the middleware includes the authentication information of the middleware such as hash value, signature, version information of the middleware, and time information at which the copy of authentication information is copied with which the middleware of the server 1000 or the client 1001 inspects whether the copy of authentication information is tampered or not.

Generally, a communication rate between the anti-tampering device 1016 and controller 1015 is frequently less than that between the storage 1017 and controller 1015. Therefore, a user can reduce the time required for read operation of the certificate 2043 at the time of using the storage device in view of improving usability when the OS or application on the client 1001 caches or copies the authentication information in the anti-tampering device 1016 to the storage 1017. The copy of authentication information 2021 is preferably verified whenever the storage device 1014 is utilized. In this case, the hash value in the copy of authentication information 2021, signature by secret key in the anti-tampering device 1016 and OS or application on the client 1001 are used.

FIG. 4 is a block diagram illustrating the details of the client 1001. The client 1001 includes the CPU 3000, memory 3001, storage 3002, interfaces (I/F) 3020, 3021, 3022, 3023. The storage 3002 is a non-volatile storage medium such as flash memory, hard disk, EEPROM, MRAM, MO, or optical disk.

The CPU 3000 executes the application loaded to the memory 3001 from the storage 3002 and makes communication with the display 1008, network 1006, user interface 1010, reader/writer 1012 via the I/F 3020, 3021, 3022, 3023.

The certificate 3010, log information 3011, library for device access 3012, tool for device management 3013, device driver 3014, interface handler 3015, application for remote manipulation terminal 3016, application for constituting encrypted communication channel 3017, and job application 3018 are stored in the storage 3002.

The certificate 3010 is used for conducting arithmetic operation with which the client 1001 and server 1000 identify the user and the storage device 1014. The format of certificate 3010 should satisfy, for example, the specification of X.509 specified in the ITU.

In the certificate 3010, for example, the version number of certificate, the serial number of certificate, public key information of a user, information of certification authority having issued the certificate, the term of validity of certificate, information of a user and storage device such as name, an electronic mail address and an inherent identification number of the storage device, and expanded area are recorded. The certificate 3010 is the certificate of the copy of the certificate 2043 in the storage device 1014 and certificate 2010 in the storage 1017 and the anti-tampering device 1014 such as the root certification authority, intermediate certification authority and storage device 1014 for certificating the user and certificate individually registered by the user. This certificate is used in the client 1001 and server 1000 for verification of the authentication information and encryption of data and session key or the like.

The log information 3011 is updated with an instruction from the CPU 3000 or server 1000 when a user has manipulated the client 1001. The log information 3011 is used by the application on the server 1000 or the application on the client 1001 or is used by a user to check the usage condition thereof. The log information 3011 is recorded with addition of the signature of the hash value in order to prevent tampering from a third party.

FIG. 5 illustrates the details of communications conducted among the user, storage device 1014, client 1001, and server 1000 when a user inserts the storage device 1014 into the client 1001 to use the server 1000. The user connects, until the start of use of the client 1001, the storage device 1014 storing the authentication information of a user and the application for operating the client 1001 to the reader/writer of client 1001. If the user does not have experience of using the client 1001, the user installs the device driver 2014, information required for manipulating the server 1000 such as device management tool 2013 and application 2017 for a remote manipulation terminal to the client 1001 using the installer 2016 in the storage device 1014. In this case, it is not required to install the application which can be executed in direct from the storage device 1014 with the client 1001.

A user issues first an operation check request to the client 1001 as indicated in the sequence 4000. If the user requesting operation check (4001) of server 1000 cannot check the operation thereof, the client 1001 turns ON the power supply of the server 1000 by utilizing such function as "Wake up on LAN." The Wake up on LAN serves to turns ON the power supply of an apparatus using LAN which is available for use in turning ON the power supply of the server from the distant area prepared on the storage device 1014 or on the client 1001 with the installer 2016. In this case, only the I/F for the network of the server 1000 is always fed and the server 1000 is driven (4002, 4003) using a set of the ID and the password and a certain authentication information such as the MAC address of the network board. With this manipulation, the server 1000 is driven (4004). Upon completion of drive of the server, a user inputs the log-in request to the client 1001 (4005). When the remote manipulation application 2017 and the application 2018 for constituting encrypted communication channel are not yet installed to the client 1001, these are loaded (4006) to the client 1001 at this timing. Next, the client 1001 issues (4007) the log-in request to the server 1000. Depending on the setting of security policy for the log-in from a remote device of the server 1000, when authentication using the public key infrastructure (PKI) is necessary or is possible in the user authentication for the log-in, the authentication information is requested (4008) from the server 1000, the certificate is requested (4009) from the client 1001, the certificate is transmitted (4010) from the storage device 1014, and the signature is requested (4011) from the client 1001. When the signature is generated in the storage device 1014, user authentication is required. User authentication is conducted with the biological body authentication information such as a password number, a password, a passphrase, a one-time password, and fingerprint information.

In this embodiment, an example utilizing a password number is indicated. After, a password request (4012) is issued from the storage device 1014, the password request is displayed (4013) on the display 1008 to users from the client 1001. When a user transmits (4014, 4015) the password number to the storage device 1014 via the user interface 1010 and the client 1001, an electronic signature is generated (4016) using one or several keys among the secret keys 2040 for the information transmitted from the server 1000, client 1001 in the CPU 2001 or the CPU 2030 within the storage device 1014. The generated signature is transmitted (4017) to the client. The client 1001 transmits (4018) the authentication information of the certificates 2010, 2043 and the generated signature. Next, the server 1000 and the client 1001 conducts the key exchange (4019) of the secret common keys utilizing mutual key information and the certificates such as the secret key and the public key. This key exchange 4019 is performed with the application 2017 for a remote manipulation terminal or the application 2018 for constituting encrypted communication channel. The server 1000 and the client 1001 constitute the encrypted communication channel using the secret common key exchanged in the sequence 4019 and the information communicated between two parties is encrypted. In the stage where the encrypted communication channel is constituted, a user drives the application stored on the server 1000, or the client 1001, the storage device 1014 for execution of job (4020).

During job execution, the CPU 2001 or the CPU 2030, or the server 1000 or the client 1001 adds the information to the log-information 2011, 2042, 3011 to adequately monitor the job execution by a user. The log-information described is subjected to the process for preventing falsification and is then stored within the storage device 1014 and the client 1001. However, this log-information is transmitted to the server 1000 at the adequate timing such as start of use and end of use by a user.

An administrator who is conducting the management of server 1000 used from users supervises the log information 2011, 2042, 3011 and the information to be transmitted to the server 1000 and conducts the operation for suspending the use of the server 1000, or the client 1001, or the storage device 1014 when a user has used the apparatus violating the policy generated by the administrator. Violation of policy includes, for example, falsification of log, irregular using time, irregular communication amount, irregular access via the network 1006, detection of irregular file existing in the client 1001, and inadequate preparation for update of file and application, or the like. Operation for suspending the use of the server 1000, or the client 1001, or the storage device 1014 includes inhibition of log-in by a user into the server 1000 and the client 1001, power supply OFF, and close of storage device 1014, or the like. Close of the storage device 1014 means the state where a user cannot use the storage device 1014 owing to the change of the information which the PIN verification program 2045 uses.

When such service of the server 1000 as for the job requested from a user is completed, a user issues a server OFF request to the client 1001 (4021). The server OFF request is transmitted to the server 1000 from the client 1001 (4022). The server 1000 and the client 1001 turn OFF of the session (4023). The server 1000 stores the log of the usage information of a user on the server 1000 (4024) and turns OFF the power supply of the server 1000. If a user does not issue the server OFF request 4021, the server power supply will not be turned OFF (4025). After the server power supply is turned OFF, the jog is executed in the sequence illustrated in FIG. 5.

FIG. 6 illustrates the initialization manipulation of the storage device 1014 conducted by the administrator in order for a user to use the server 1000, the client 1001, and the storage device 1014. A series of operations explained in FIG. 6 are conducted before a user starts the use indicated in FIG. 5 or when a user has closed or missed the card and thereby has lost the right of usage.

The client 6000 is connected, like the client 1001, to the display, the user interface, and the reader/writer and is used by the administrator for the writing into the storage device 1014.

First, the administrator generates the authentication information of a user from the server 1000 by registering, to the server 1000, the name of a user, the user number, an electronic mail address, and the inherent ID number of the storage device or the like through the client 6000. Generation of the authentication information and the certificate of a user and issuance of the write request are conducted in this step (6001). Here, various programs such as the key certificate storing program 2046 are already written to the storage device 1014 from a storage device supplier. Moreover, the public key certificate of a user can be obtained by transmitting, in 6001, the public key corresponding to the secret key which has been generated separately by any of the storage device 1014, the client 6000 and the administrator. The authentication information and the public key certificate created are written into the storage device via the client 6000 (6002). Next, the administrator updates the information for controlling the usage right of the authentication information and the key in the storage device 1014 (6003, 6004). With this manipulation, the storage device 1014 is changed in the usage right for the signature request, the key update request and the key export and import request. Change in the usage right is identical to the change in the access key for information and the change in the password number. The updated access key and password number are managed by the administrator, stored in the other anti-tampering device, or notified to the users.

Next, the administrator issues a request for writing the application, while the client 6000 writes the application. Here, the application includes the library for device access 2012, the tool for device management 2013, the device driver 2014, the interface handler 2015, the installer 2016, the application 2017 for a remote manipulation terminal, the application 2018 for constituting an encrypted communication channel, and the job application 2019, or the like.

Next, the administrator issues a server connection test request (6007) to conduct the server connection test (6008). This server connection test 6008 is conducted by the administrator, for checking the validity of information and the application stored in the storage device 1014 by attempting connection to the server and the job execution process to be conducted by the user as illustrated in FIG. 5. When the connection and the job execution process are conducted normally, the storage device 1014 is transmitted to a user. Here, the storage device 1014 is subjected to the printing of ID, the face photograph, and the name of a user or is given the sealing stylus. Moreover, the access key and the password number for the information for management of storage device 1014 are also transmitted to a user with a method such as a sealed letter which is different from the method for sending the storage device 1014.

FIG. 11 illustrates middlewares operating on the client 1001 in this embodiment. The application 11000 such as the application 2017 for a remote manipulation terminal, the application 2018 for constituting an encrypted communication channel, and the job application 2019 make access to the reader/writer 1012 and the storage device 1014 by utilizing a couple of channels illustrated. When access and management of files within the card are required, the card OS and application 11004 in the storage device 1014 are called via the API 11001 for file access, the driver 11002 for file access and the reader/writer firmware 11003 in the reader/writer 1012. Moreover, when it is requested to issue commands relating to security authentication such as issuance of the instruction to the anti-tampering device 2032 in the card, the card OS and application 11004 in the storage device 1014 are called via the interface handler 3015, the device driver 3014, the reader/writer firmware 11003 in the reader/writer 1012. In this case, the driver 11002 for file access, the reader/writer firmware 11003, and the device driver 3014 always monitor the access state of the storage device 1014 and the reader/writer 1012 so as not to simultaneously generate instructions of them and perform with themselves the congestion control such as stock and rejection of instructions in view of conducting adequate access to the storage device 1014.

FIG. 13 is a flowchart for explaining the congestion control to be executed by the device driver 3014 and the driver 10002 for file access. The device driver 3014 and the driver 11002 for file access are initialized when the OS is driven and start the processes thereof (13000). Here, the request for the driver 11002 for file access or the request in the queuing condition are checked (13001). When such request is issued, file access is made to the card via the reader/writer (13002). Next, the request to the device driver 3014 is checked (13003). When such request is issued, access is made to the CPU 2030 via the reader/writer (13004). In this timing, the request to the driver 11002 for file access is checked (13005). When this request is issued, the request to the driver 11002 for file access is queued by the processes. This request queuing process is executed in the driver 11002 for file access and thereby the request to be queued is stocked in the memory area generated for queuing the request. The stocked request is then processed when the process 13002 is executed. However, if the stock time until execution of process by the process 13002 has exceeded the predetermined constant amount, irregularity such as timeout is notified to the application in the process 13005 and then the process is terminated. Recognition for the end of request to the device driver 3014 is checked (13007). When the process is not yet completed, the re-process is started from the process 13004.

Moreover, an end request from the OS is checked (13008). When such request is not issued, the process is started again from the process 13001. With 5 the congestion control by the device driver 3014 and the driver 11002 for file access as explained above, access of the storage device 1014 via the reader/writer is maintained like the ordinary storage device. Congestion control means the control of congestion of the instruction for file access and instruction for the anti-tampering device. The driver 11002 for file access is capable of executing such congestion control with the ordinary mass-storage device driver or the upper filter driver or the lower filter driver connected to the mass-storage device driver. Moreover, such congestion control can be realized by providing a memory area or a buffer for saving the instructions to the reader/writer firmware and then queuing the instructions thereto.

In addition, congestion control will be explained in more detail. Congestion control means a queuing process or a competition solving process explained below. Here, the congestion may be controlled by means of software-oriented solution, i.e., by generating a list queued commands (explained later) in the memory area on the client and then processing this list or by using the firmware of reader/writer, otherwise by means of hardware-oriented solution, i.e., providing a buffer on the reader/writer.

FIG. 14 is a time chart indicating profiles of commands issued by the congestion control in the device driver 3014 and driver 11002 for file access. Here, it is assumed that an instruction has been issued from the application to sequentially generate the access commands 1 and 2 to the CPU 2030 from the driver. The command 1 is issued to the storage device 1014 as illustrated in the command for file access in FIG. 14 and a response 1 is issued as its response. Next, the command 2 is issued to the storage device 1014 and a response 2 is issued as its response. Here, it is also issued that the command for file access 3 and a command 4 are issued during the issuance of the command and the response. In this case, the driver for file access is stored in the command list in which the command 3 and command 4 are saved. When it is decided that there is no input from the command for access to the CPU 2030 in the process 13002 in FIG. 13, a command 3 for file access being saved is issued and a response 3 is issued as the response. Next, a command for file access 4 being queued is then issued, and a response 4 is issued as the response. In total, as illustrated as "all commands and responses" in FIG. 14, the command 1, the response 1, the command 2, the response 2, the command 3, the response 3, the command and the response 4 are issued sequentially.

As explained above, the client 1001 in this embodiment is capable of constituting a safer and yet user-friendly job system which can be used flexibly by inserting the storage device 1014 including the anti-tampering storage function and then remotely manipulating the server 1000.

Moreover, since a user can execute the job in the manipulation feeling similar to that in use of the client 1001, even if the client 1001 used has been changed to the client 1002, usage flexibility of a user can surely be improved.

Another advantage is that when a user stops usage, since a temporary storage file which has been used by the user is erased, even if the information in the client 1001 is exposed to the risks by a third party, the information used by the user is safely protected and that the secret information and the information including privacy used by the user supplied from the client 1001 in which the power supply is turned OFF are thus made to be harder to leak than used to be, and thereby improving the user-friendliness.

Moreover, in this embodiment, the client 1001 and the server 1000 have been described to have the other structures. However, on the contrary, the client 1001 may also be designed that it has the function of the server 1000 and that the server 1000 is used in place of the client 1001. The server 1000 and the clients 1001, 1002 have been described as a PC, a personal digital assistance (PDA) and a work station but they are not limited to these. The server 1000 and the clients 1001, 1002 may also be described as a highly-sophisticated copying machine, an automatic teller machine (ATM), a mobile phone, a digital still camera, a video camera, a music reproducing (recording) apparatus, a product management system in the POS system, a town terminal, a transmitter for intelligent transport systems (ITS), a ticket vendor, a settlement terminal, an automatic gating machine, an automatic vendor, an incoming/outgoing management apparatus, a game machine, a public telephone, a mobile terminal for getting order, an electronic purse, a pay broadcast receiver, and a medical card management apparatus or the like.

(Second Embodiment)

A second embodiment of the secure remote access system of the present invention will be explained with reference to FIG. 7 to FIG. 9.

FIG. 7 is a diagram illustrating the remote access system for the second embodiment of the present invention.

The server 1000, the client 1001, and the storage device 1014 used by a user are identical to that explained in the first embodiment. A gateway 7000 is a relaying device for encrypting communications between the client 1001 and the server 1000 and for authenticating a user and an apparatus to be used.

The gateway 7000 is generally called a fire wall, an encrypting gateway, or a virtual private network (VPN) gateway, or the like. In this second embodiment, the gateway 7000 is explained as a server to which the fire wall and encrypted communication function are installed. However, for example, such gateway may be a network router, a wireless LAN access point, a network hub, or a broadband router. The network 7001 is, for example, a public link such as Internet and regional IP network having higher risk for wiretapping or tampering of communication contents from the network 1006. The client 1001 performs encrypted communication and authentication for such communication between the gateway 7000 and client 1001 for the remote manipulation of the server 1000 through the network 7001.

The gateway 7000 that includes a CPU 7002, a memory 7003, and a storage 7004 performs the encrypted communications preset in the storage 7004 during operation and controls the communication, through the CPU 7002, where the application for authentication is loaded to the memory 7003. The gateway 7000 also connected to the server 7005 for authentication in direct or via the network. The server 7005 for authentication accumulates the authentication information for the encrypted communication at the gateway 7000 and sends a response to inquiry from the gateway 7000 or initializes, activates, or individualizes the storage device 1014 through the reader/writer 7007 on connection. The server 7005 for authentication may include an internal certification authority or may have only the role for notifying a certificate of external certification authority, a list of certificates of external certification authority and a list of certificate revocation to the gateway 7000 through the management thereof.

FIG. 8 is a diagram illustrating the details of communications conducted among the administrator, user, storage device 1014, client 1001, gateway 7000 and server 1000 when the storage device 1014 is initialized and a user inserts the storage device 1014 to the client 1001 to use the server 1000 for the purpose of utilizing the remote access system of this embodiment.

The administrator inserts the storage device 1014 to the reader/writer 7007 which can make communication with the authentication server 7005. This administrator also generates the authentication information of the user from the authentication server 7005 by registering a name, a user number, an electronic mail address of a user and the inherent ID number of the storage device or the like to the authentication server 7005 through the client 1001. Generation of the authentication information and the certificate and the issuance of write request are conducted (8001). Here, various programs such as key certificate storing program 2046 are already written to the storage device 1014 from a storage device supplier. Moreover, the public key certificate of a user can be obtained by sending, in the step 8001, the public key corresponding to the secret key which has been separately created by the storage device 1014, the authentication server 7005 or the administrator. The generated authentication information and the public key certificate are written into the storage device 1014. Next, the administrator updates the authentication information in the storage device 1014 and the information (8003, 8004) for controlling the usage right of key. With this manipulation, the usage right for the signature request, the key update request and the export and import request of key in the storage device 1014 can be updated. Update of the usage right means the update of access key for the information and the update of the password number. The updated access key and the password number are stored by the administrator, the other anti-tampering device or notified to the user.

Next, the administrator issues an application write request, while the authentication server 7005 writes the application. Here, the application includes the library 2012 for device access, the tool for device management 2013, the device driver 2014, interface handler 2015, the installer 2016, the application 2017 for a remote manipulation terminal, the application 2018 for constituting an encrypted communication channel, and the job application 2019, or the like.

Next, the administrator issues a server connection test request (8007) to conduct the server connection test (8008). The server connection test 8007 is conducted for checking validity of information and the applications recorded in the storage device 1014. When connection and job execution process are conducted normally, the storage device 1014 is sent to the user (8009). In this case, the access key and the password number for the information for management of the storage device 1014 are also transmitted to the user with such a method as the sealed letter, differently from the method of transmission of the storage device 1014.

Next, the user connects the storage device 1014 storing the authentication information of a user and the application for operating the client 1001 to the reader/writer of the client 1001 until the use of the client 1001 is started. If the user does not have experience of using the client 1001, the user installs, to the client 1001, the information or the application required for manipulation of the server 1000 such as the device driver 2014, the device management tool 2013 and the application 2017 for remote terminal using the installer 2016 in the storage device 1014. In this case, it is no longer required to install the application which can be executed in direct from the storage device 1014 with the client 1001.

The user issues first a gateway connection request to the client 1001 as indicated in the sequence 8010. The client 1001 checks the server operation to the gateway 7000 (8011). When authentication of a user using PKI is required or is possible, although depending on the setting of the security policy for log-in from the remote apparatus of the gateway 7000, the gateway 7000 requests the authentication information from the gateway 7000 (8012) and requests the certificate from the client 1001 (8013), transmits the certificate from the storage device 1014 (8014) and also requests a signature from the client 1001 (8015). When generating a signature in the storage device 1014, authentication of a user is necessary. User authentication is performed using a PIN, a password, a passphrase, a one-time password or a biological authentication information such as fingerprint information. In this embodiment, an example of using the PIN is explained. After the password request is issued from the storage device 1014 (8016), the client 1001 displays the password request (8017) to the user on the display 1008. When the user transmits the PIN to the storage device 1014 via the user interface 1010 and the client 1001 (8018, 8019), an electronic signature is created (8020) using one or several keys among the secret keys 2040 for the information transmitted from the server 1000 and the client 1001 in the CPU 2001 or the CPU 2030 in the storage device 1014. The signature created is then transmitted to the client (8021). The client 1001 transmits the authentication information such as the certificates 2010, 2043 and the signature created (8022). Next, the server 1000 and the client 1001 perform key-exchange of the secret common key using the key information such as the secret key and the public key and the certificate (8023). This key-exchange 8023 is conducted by the application 2018 for constituting an encrypted communication channel. Using the secret common key exchanged in the sequence 8023, the gateway 7000 and client 1001 constitutes the encrypted communication channel and the information communicated between a couple of parties is encrypted.

Next, the user issues an operation check request to the client 1001 as indicated in the sequence 8030. The client 1000 checks the operation of the server 1000 (8031). If operation of server 1000 cannot be checked, the user turns ON the power supply of the server 1000 utilizing the function of the Wake up on LAN which turns ON the power supply of the apparatus with use of the LAN to turn ON the power supply of the server from a distant place prepared on the client 1001 with the storage device 1014 or the installer 2016. In this case, the I/F for the network of the server 1000 is always fed to drive the server 1000 (8032, 8033) and started by making use of a certain authentication information such as a set of ID and the password and the MAC address of network board. With this manipulation, the server 1000 is driven (8034). Upon completion of drive of the server, the user inputs a log-in request to the client 1001 (8035). This manipulation is executed by the application for remote manipulation 2017 in the client 1001. If this application for the remote manipulation is not installed, it is loaded to the client 1001 in this timing. Although depending on the security policy for the long-in from the remote apparatus of the server 1000, when authentication of a user using the PKI is necessary or possible at the time of log-in, an authentication information request is issued from the server 1000 and creation of the signature and the transmission thereof are conducted for the server 1000 as in the case of the steps 8012 to 8023. Since the user has passed the severe authentication in the gateway 7000, when the server 1000 relies on the communication from the gateway 7000, authentication in the server 1000 for issuing a log-in request 8035 may be done easily using the ID and the password.

At the stage where the encrypted communication channel is constituted and log-in to the server 1000 is completed, the user drives the application stored on the server 1000 or the client 1001, storage device 1014 to execute the job (8036).

During job execution, the CPU 2001 or the CPU 2030 or the server 1000 or the client 1001 adds the information to the log-information 2011, 2042, 3011 to adequately monitor job execution of the user. The log-information described is subjected to the process for preventing falsification and is then stored in the storage device 1014 and the client 1001. However, this log-in information is then transmitted to the server 1000 in the adequate timing such as the time of starting use or the time of ending use by the user.

The administrator for management of server 1000 used by the user supervises the information of the log-information 2011, 2042, 3011 and the information transmitted to the server 1000 and executes the operation for suspending the use of the server 1000 or the client 1001 or the storage device 1014 when the user has conducted use violating the policy specified by the administrator. Violation of the policy includes, for example, falsification of log, irregular usage time, irregular communication amount, irregular access via the network 1006, detection of irregular file in the client 1001 and insufficient preparation of update of file and application, or the like. Operation for suspending the use of the server 1000 or the client 1001 or storage device 1014 includes inhibition of log-in by a user to the server 1000 and the client 1001, power supply OFF, and close of storage device 1014, or the like. Close of the storage device 1014 is identical to the case where the information to be used by the PIN verification program 2045 is updated for disabling use of the storage device 1014 by a user. When use of the server 1000 such as user job is completed, the user issues a server OFF request to the client 1001 (8037). The server OFF request is transmitted to the server 1000 from the client 1001 (8038). The server 1000 and the client 1001 shut off (8039) the session. The server 1000 stores (8040) the log of usage information of the user to the server 1000 to turn OFF the server supply of the server 1000. If the user does not issue a server OFF request 8037, the server power supply is not turned OFF (8041). After the server power supply is turned OFF, the job execution is continued in the sequence after the step 8010.

FIG. 9 is a block diagram illustrating a network structure of the remote access system in this embodiment. A group of the network designated as 9000 and apparatuses connected to the network is identical to the group formed of the network and the apparatuses which are mainly used by the user. The group 9000 of the network and the apparatuses is constituted by the local area network (LAN) in the office in which the user works and the apparatuses connected the LAN. Within the network 9000, the server 1000, client 1002, department server 9001, PC 9002, gateways 9006, 7000 and authentication server 7005 are connected around the LAN 9003. Moreover, the group of the network and the apparatuses connected to the network is identical to the group of the network on the WAN of the department other than the working section which is used when the user makes business trip and the apparatuses connected thereto. In the group 9010, the client 9008 and gateway 9007 which may be used by the user are connected around the network 9005. Moreover, the client 1001 is also connected via a router 9004 to the network in the outside of the company such as the network 7001.

Here, the user can utilize the server 1000, department server 9001, and PC 9002 connected to the LAN 9003 by using the client 1002 on the LAN, the client 9008 on the WAN, and the client 1001 connected to the LAN 9003 via the network when the user carries the storage device 1014. In this case, when the server 1000, department server 9001, PC 9002 connected to the LAN 9003 are used from the client 1002 on the LAN and the client 9008 on the WAN, the secrecy of communication contents can be maintained while the usage sequence of a user is simplified, by not encrypting the communications in the gateways 9007, 9006 but encrypting the communications when the gateway 7000 is used. Here, the department server 9001 is identical to the web server and mail server installed on the LAN and the terminal server which conducts arithmetic operation through the remote log-in. The PC 9002 is identical to the PC for common resource management used in common by the department to which the user belongs and the PC for rent prepared for persons under the business trip.

As explained above, the client 1001 in this embodiment is capable of constituting a job system which can be used safely by the user with excellent usage flexibility by inserting the storage device 1014 mounting the anti-tampering storage function and remotely manipulating the server 1000, department server 9001, and PC 9002.

Moreover, the user can continue job execution, even if the client 1001 used is changed to the clients 1002, 9008, in the feeling similar to that for using the client 1001 in various job execution places. Accordingly, usage flexibility of a user can be improved. In addition, the server 1000, clients 1001, 1002, 9008 have described as PC, PDA, and workstation, but these elements can also be described as highly sophisticated copying machine, ATM, mobile phone, digital still camera, video camera, music reproducing (recording) apparatus, product management system in the POS system, town terminal, transmitter for ITS, ticket vendor, settlement terminal, automatic gating apparatus, automatic vendor, incoming/outgoing management apparatus, game machine, public telephone, mobile terminal getting order, electronic purpose, pay broadcast receiver, medical card management apparatus, or the like.

(Third Embodiment)

A third embodiment of the secure remote access system of the present invention will be explained with reference to FIG. 10.

FIG. 10 is a diagram illustrating the remote access system as the third embodiment of the present invention.

A server 10000 used by the user is an aggregation of a plurality of servers (PCs) having the function identical to that of the server 1000. The server 10000 is operated by respective CPUs 10030, 10040, . . . , 10050 and memories 10031, 10041, . . . , 10051 provided on the servers 10032, 10042, . . . , 10052. In FIG. 10, the user performs jobs by outputting the information executed on the CPU 10030 to a display 1008 using the server 10032. The server 10000 selects the user interface 10003 and display 10002 connected to the servers 10032, 10042, . . . , 10052 by utilizing a switch 10004. Moreover, the server 10000 is connected with a controller 10001. The controller 10001 is connected to the network 1005 which may be used by a qualified user having the storage device 1014 like the server 10000. Here, when the user tries to use the servers 10032, 10042, . . . , 10052, the controller 10001 notifies, to the client, the states of power supply management and power supply ON/OFF of the servers 10032, 10042, . . . , 10052. Particularly, if communication to the servers 10032, 10042, . . . , 10052 from the client 1001 becomes OFF, the user logs into the controller 10001 to check the state of the servers 10032, 10042, . . . , 10052 and turns ON and OFF the power supply thereof. Within the controller 10001, the storage for server boot such as hard disk and flash memory is mounted and the servers 10032 to 10052 are booted up using the data on the storage. Therefore, number of steps for management of server by the user can be reduced.

As explained above, the server 10000 can reduce the number of steps for management of the servers 10032, 10042, . . . , 10052 by the administrator, because of the characteristics of including the server having a plurality of similar functions within only one housing, by utilizing the server 10000 and controller 10001 indicated in this embodiment from the client 1001 to which the storage device 1014 mounting the anti-tampering storage function is inserted. Moreover, usage flexibility can be improved through easier management of power supply of the server when the user utilizes the controller 10001.

(Fourth Embodiment)

A fourth embodiment of the secure remote access system of the present invention will be explained with reference to FIG. 1, FIG. 15 and FIG. 16. This embodiment is useful when the user of the secure remote access system performs jobs via the public client apparatuses which are used by many peoples.

In general, the applications used by a certain individual or a plurality of users and personal setting information are stored in the public client apparatus. This embodiment presents the secure remote access system in which such applications and personal setting information are not installed and stored in the storage 3002 within the client apparatus 1001. Moreover, highly convenient secure remote access system can be presented by alleviating amount of manipulation of users.

FIG. 15 is a block diagram illustrating the details of the storage device 1014 as a fourth embodiment of the present invention. In this embodiment, a boot program 15001 and an OS program 15002 are newly added to the storage 1017 within in the storage device 1004 of the first embodiment. The boot program 15001 is executed first with a BIOS (Basic Input/Output System) of the client 1001 when this client is driven and has a role of driving the OS for client 1001. The OS program 15002 is provided for the client 1001 and is also read and driven on the memory 3001 within the client 1001 from the storage device 1014 with the boot program 15001.

The server 1000 and clients 1001, 1002 used by the users are identical to those in the first embodiment.

FIG. 16 is a diagram illustrating the details of communications among the user, the storage device 1014, the client 1001 and the server 1000 when a user inserts the storage device 1014 illustrated in FIG. 15 to the client 1001 in order to use the server 1000. The user is requested to connect the storage device 1014 storing the authentication information of the user and boot program, OS program, and the application or the like for operating the client 1001 to the reader/writer 1012 of the client 1001 until the client 1001 is driven. Moreover, the BIOS of client 1001 must be previously set to detect the boot program through the reader/writer 1012 with the priority to detection thereof through the storage 3002. Difference from the first embodiment is that even if a user has no experience of utilizing the client 1001, the user is not requested to install the information or application for manipulating the server 1000 such as the device driver 2014, device management tool 2013 and application for remote terminal 2017 to the storage 3002.

The user first turns ON the power supply of the client 1001 as illustrated in the sequence 16001. The BIOS of client 1001 is driven (16002) thereby to request (16003) the boot program 15001 to the storage device 1014. The storage device 1014 transmits (16004) the boot program 15001 responding to the request. The BIOS of client 1001 starts (16005) the boot process by executing the boot program 15001. In the boot process, the boot program 15001 requests (16006) the OS program 15002 to the storage device 1014. The storage device 1014 transmits (16007) the OS program 15002 responding to the request. The OS program 15002 is read on the memory 3001 within the client 1001 and is then driven (16008). Subsequently, the application, library, driver, and management tool or the like (2012 to 2019) stored in the storage device 1014 can be read onto the OS and then operated. It is described in the OS program 15002 that the particular application is executed automatically immediately after drive of the OS. Accordingly, the client 1001 requests (16009) the application for remote manipulation 2017, application 2018 for constituting an encrypted communication channel and moreover the library, driver or the like required for execution of such applications to the storage device 1014. Responding to this request, the storage device 1014 transmits these applications (16010). The client 1001 then drives these applications (16011).

In these application programs, the IP address which the user desires to use is previously described. The client 1001 automatically checks operation to the server 1000 of such IP address (16012). If operation of the server 1000 cannot be checked, the client 1001 turns ON the power supply of the server 1000 by utilizing the function such as the Wake on LAN. In this case, only the I/F for the network of the server 1000 is always fed and drive of the server 1000 is requested by using a certain authentication information such as a set of the ID and the password and MAC address of the network board (16013). Therefore, the server 1000 is driven (16014). When the server is driven, the client 1001 issues a log-in request automatically to the server 1001 (16015). Although, depending on the setting of the security policy for the log-in from a remote apparatus of the server 1000, when authentication using the public key infrastructure (PKI) is necessary or is possible for the user's authentication, the server 1000 requests (16016) the authentication information to the client 1001, the client 1001 requests (16017) the certificate to the storage device 1014, the storage device 1014 transmits (16018) the certificate to the client 1001, and the client 1001 requests (16019) the signature to the storage device 1014.

On the occasion of generating the signature in the storage device 1014, user authentication is necessary. The user authentication is conducted using the PIN, password, passphrase, one-time password and/or the biological body authentication information such as fingerprint information. In this embodiment, an example of using the PIN is illustrated. After the storage device 1014 has issued a password request (16020), the password request 16021 is displayed on the display 1008 to the user from the client 1001. When the user transmits (16022, 16023) the PIN to the storage device 1014 via the user interface 1010 and the client 1001, an electronic signature using one or several keys among the secret keys 2040 is created (16024) for the information transmitted from the server 1000 and the client 1001 in the CPU 2001 or the CPU 2030 in the storage device 1014. The signature created is then transmitted to the client (16025). The client 1001 transmits the authentication information such as certificates 2010, 2043 and the signature generated (16026).

Next, the server 1000 and the client 1001 conducts key-exchange of the secret common key using the mutual key information of secret key and public key and the certificate (16027). This key-exchange 16027 is executed with the application 2017 for a remote manipulation terminal or the application for constituting the encrypted communication channel 2018. The server 1000 and the client 1001 constitutes the encrypted communication channel using the secret common key exchanged in the sequence 16027 and thereby the information communicated between two parties is encrypted. In the stage that the encrypted communication channel is constituted, the user drives the application stored in the memory 3001 in the client or the storage device 1014 for execution of job (16028).

After completion of job, the client 1001 turns OFF communications with the server 1000 as indicated in the sequences 4021 to 4025, while the user turns OFF the power supply of the client 1001 and then removes the storage device 1014 from the reader/writer 1012. Accordingly, since the information on the memory 3001 is also volatilized, the applications and personal information used by the user are no longer remained at all within the client 1001. Therefore, privacy of users can be protected in the secure remote access system using the public client.

Moreover, since the OS program operating on the client 1001 is administrated by the user within the storage device 1014, it is possible to eliminate the risk that the PIN of the user is stolen by the illegal program such as the computer virus which has been secretly set by a third party into the OS installed by the client. Accordingly, security of a user can also be protected in the secure remote access system using the public client.

Moreover, since the process up to the connection of the user to the job object server 1000 from start of use of the client 1001 is automated with the boot program 15001 and OS program 15002 as illustrated in FIG. 16, manipulation requested for the user is only turning ON of the power supply 16001 and transmission of PIN 16022. Therefore, convenience of the secure remote access system can be improved for the user.

(Fifth Embodiment)

A fifth embodiment is effective when the user utilizing the secure remote access system in the fourth embodiment executes the job via the safe and reliable client.

In the secure remote access system in the fourth embodiment, the OS operating in the client 1001 is read from the storage device 1014. However, when the user uses the safe and reliable client such as the own PC or the PC installed in the well administrated office like the rental office or the office as the destination of business trip in place of the client apparatus which is not assured in its safety like the public client apparatus, the OS installed within the client may be used without reading out the OS from the storage device 1014.

For this purpose, the reader/writer 1012 in this embodiment has the function to select the drive mode. In more practical, a mechanical switch is mounted as illustrated in FIG. 17A. This switch is capable of switching the operation mode for enabling transmission of the boot program 15001 to the client 1001 from the storage device 1014 and the mode for disabling such transmission. When this switch is set to transmit the boot program 15001, the secure remote access system can operate as illustrated in FIG. 16 (namely, as in the case of the fourth embodiment).

Meanwhile, if transmission of the boot program 15001 is disabled, since the OS installed in the client is driven, in place of the OS program 15002, the secure remote access system operates as illustrated in FIG. 5 (namely, as in the case of the first embodiment). FIG. 17A illustrates such processes. The user selects to transmit or not to transmit the boot program 15001 with the switch 17000. When transmission of boot program is not selected, the storage device 1014 transmits a dummy data 17001 to the client apparatus. When the dummy data 17001 is loaded on the memory 3001 of the client 1001, the BIOS fails drive of OS through the storage device 1014 and therefore drives the OS within the storage 3002.

Here, it is also possible to select, using a switching means such as the switch explained above, transmission or non-transmission of the OS program 15002 from the storage medium side (including the reader/writer 1012). However, in this case, the boot program is transmitted to the client apparatus from the storage medium side. When setting is made not to transmit the OS program by manipulating this switching means, the dummy data is transmitted to the client apparatus from the storage medium side. The boot program having received the dummy data reads the OS program from the apparatus defined as the OS program read destination which has been previously set thereto. In this case, as the OS program reading destination apparatus, the storage 3002 in the client 1001 and the storage for calculation on the network may be selected.

Moreover, even when transmission of the boot program from the storage medium side is rejected in FIGS. 17A, 17B and the boot program in the client apparatus side is loaded, the OS program can also be read from the storage device of the own apparatus or the other apparatus.

A mechanical switch for selecting the drive mode as explained above may be loaded on the storage device 1014. In general, the area in which the boot program is stored in the disk device for PC is indicated with the first logical sector address. Transmission of the boot program 15001 can be controlled by switching acknowledgment or non-acknowledgment of data read from such area using this switch. As a result, the drive mode can be selected with this switch. FIG. 17B illustrates such processes. A switch 17002 is capable of selecting transmission of the boot program 15001 or transmission of the dummy data 17003. When the dummy data 17003 is loaded to the memory 3001 of the client 1001, the BIOS fails drive of the OS through the storage device 1014 and therefore drives the OS stored in the storage 3002.

Another method for selecting the drive mode is that the client 1001 is discriminated as the safe terminal or not by inspecting various devices forming the client 1001 using the boot program 15001. FIG. 17C illustrates such processes. When the boot program 15001 loaded on the memory 3001 has decided the client 1001 as non-reliable terminal, the OS program 15002 is loaded to the memory 3001 and is then driven. When such client is decided as the reliable terminal, the OS stored in the storage 3002 is driven. When the device authentication process is executed using the anti-tampering device 1016 within the storage device 1014 at the time of surveying the device within the client 1001, more reliable authentication can be realized. In this case, it is preferable that the key and certificate required for the device authentication process program and device authentication process are previously stored into the storage 2032 of the anti-tampering device 1016 and the CPU 2030 in the storage device 1014 executes the device authentication process conforming to the instruction from the boot program 15001. The method for surveying various devices forming the client 1001 with the boot program 15001 can be realized using the boot program 15001, for example, by surveying and verifying the serial numbers assigned to the CPU, memory, storage device, and network card which are provided in the client 1001 or connected to the client 1001, the number assigned on one to one basis to the number and component like the MAC address, and the certificate. Such number and certificate are numbered with the manufacturer of CPU, the memory, the storage device and the network card, the manufacturer of client and component and the administrator.

Another method for selecting the drive mode in FIG. 17C is that the OS within the storage 3002 is surveyed whether it is in the encrypted state and state locked by password or not and then the OS program 15002 is loaded to the memory 3001 and is then driven. In this case, the CPU 2030 in the storage medium side performs the device authentication and the survey to detect whether the OS in the storage 3002 is in the state encrypted and locked with password or not can be conducted with the CPU 3000 in the client apparatus side.

FIG. 18 is a flowchart for explaining operations when the OS of the fifth embodiment explained using FIG. 17C is driven.

After drive of the boot program (18000), with the method explained above, the boot program 15001 loaded to the client 1001 from the storage medium gathers the information required for device authentication, and transmits this information to the CPU 2030 in order to control the CPU 2030 to decide whether the device authentication has been succeeded or not (18001).

When decision result is that authentication has succeeded (YES), it is in turn decided (18002) whether the data such as OS stored cannot be read without input of the information such as the password to the storage 3002 with the lock function such as password lock and the encrypting function (18002).

Next, the whether authentication information can be acquired or not from the storage device 1014 is decided (18003). A picture is displayed to urge the user input the information for canceling lock and encrypting operation and the input is then transmitted to the CPU 3000 and storage 3002 (18004). When decision in the step 18003 has succeeded (YES) or operation in the step 18004 is completed, the storage 3002 performs, for example, the inspection whether the information received is matched with the information stored or not, such as comparison with the password using the received information (18005). When the received information has passed the inspection (YES), the user is authorized to have the legal right for using the storage 3002. Therefore, the OS program 15002 and the other data stored in the storage 3002 can be used. Accordingly, the OS is driven using the storage device 3002 (18006) and drive of the OS is completed (18007).

If decision in the step 18002 has failed (NO), it means that lock and encrypting operation is effective. Therefore, the OS is driven using the storage device 3002 (18006) and drive of the OS is completed (18007). If the decision in the step 18005 has failed (NO) or when the decision in the step 18001 has failed (NO), the OS program 15002 is loaded to the memory 3001 and is then driven (18008). Thereafter, drive of the OS is completed (18009).

The means for switching the destination for read operation of the OS on the basis of the decision result of authentication in FIG. 17C may be a mechanical means such as a key or may be a software means like combination of the controller and bus.

As explained above, the boot program and the OS program to be used property by the user can be selected by deciding whether the client is reliable or not and whether the OS and storage in the client may be used or not through usage of the storage device, reader/writer and client explained in the fifth embodiment. Thereby, security for use of the client by the user can be enhanced. Moreover, highly convenient and reliable secure remote access system can be provided by automatically selecting the OS to be driven and by automatically inputting the authentication information.

Figure 1:
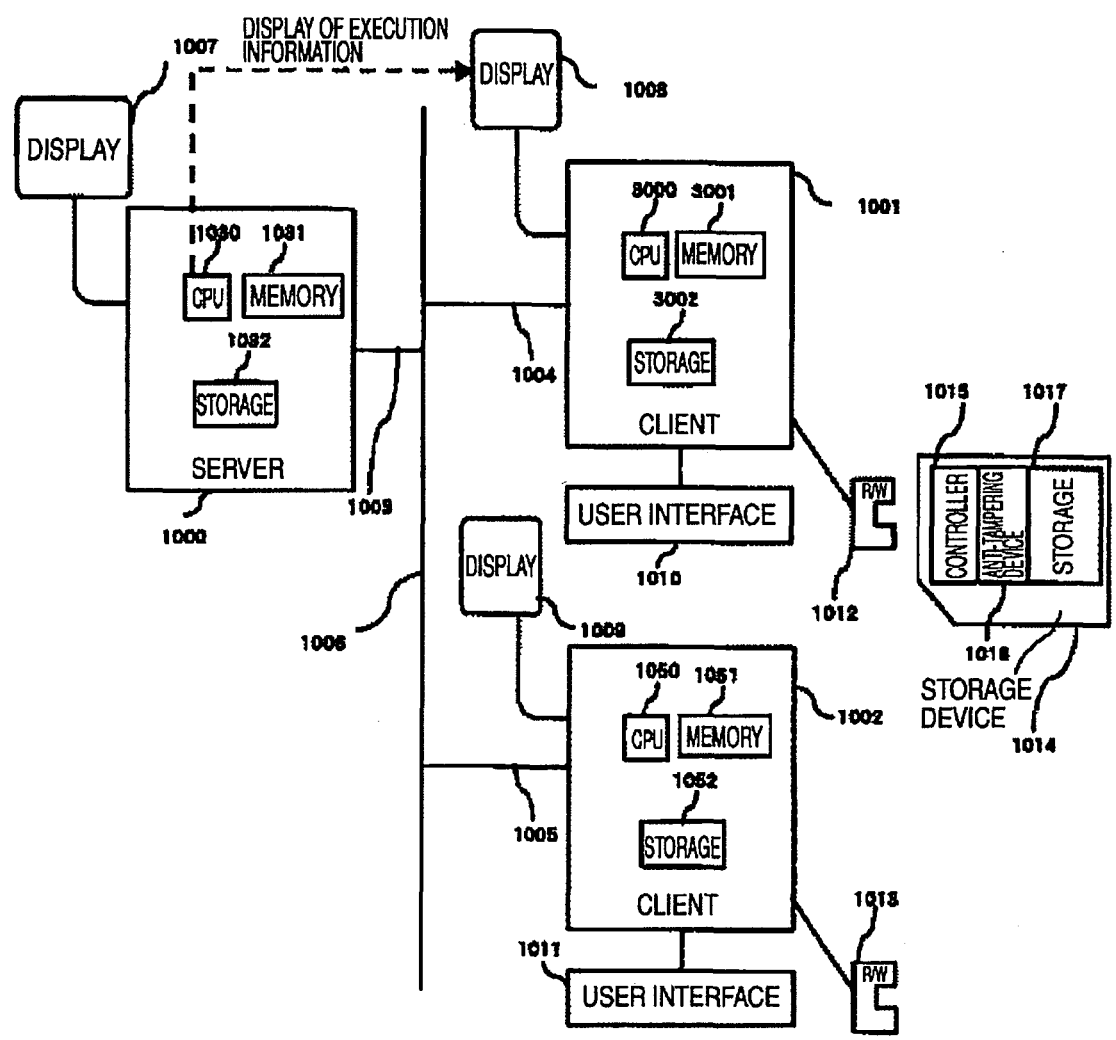
FIG. 1 is a block diagram for explaining a secure remote access system as a first embodiment of the present invention.
Figure 2:
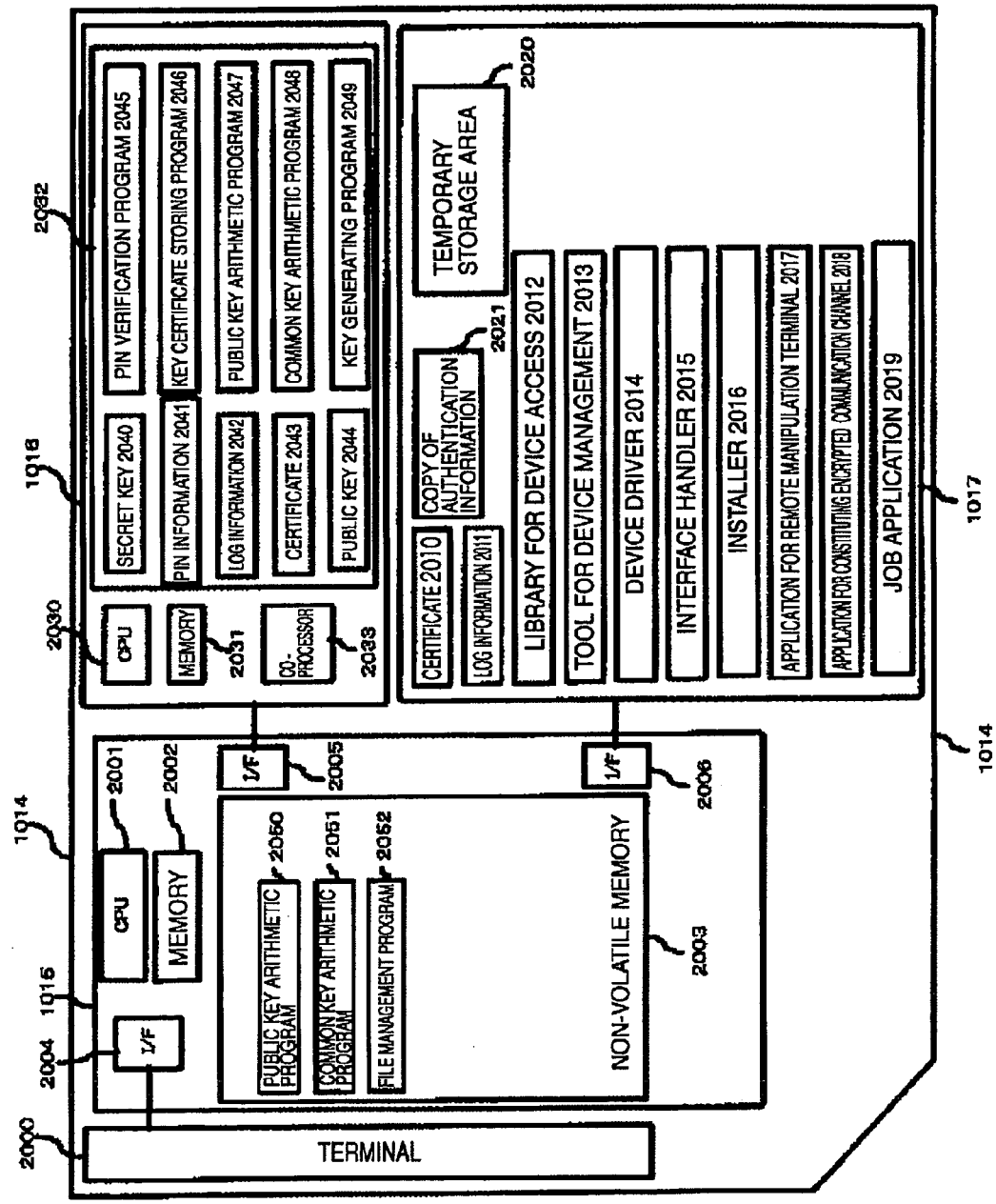
FIG. 2 is a block diagram for explaining a storage device in the first embodiment of the present invention.
Figure 3:
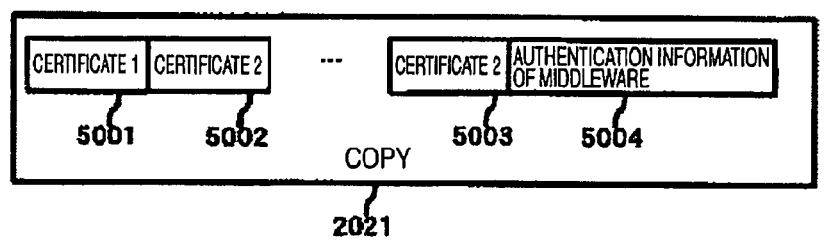
FIG. 3 is a diagram illustrating a format of a copy of authentication information in the first embodiment of the present invention.
Figure 4:
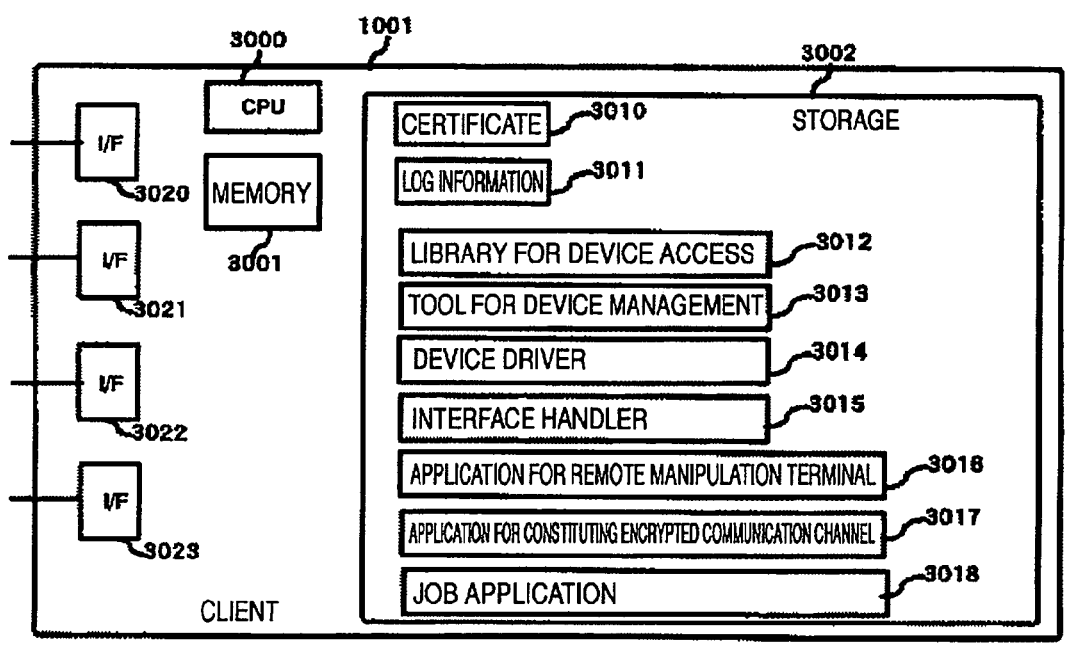
FIG. 4 is a block diagram illustrating the details of a client in the first embodiment of the present invention.
Figure 5:
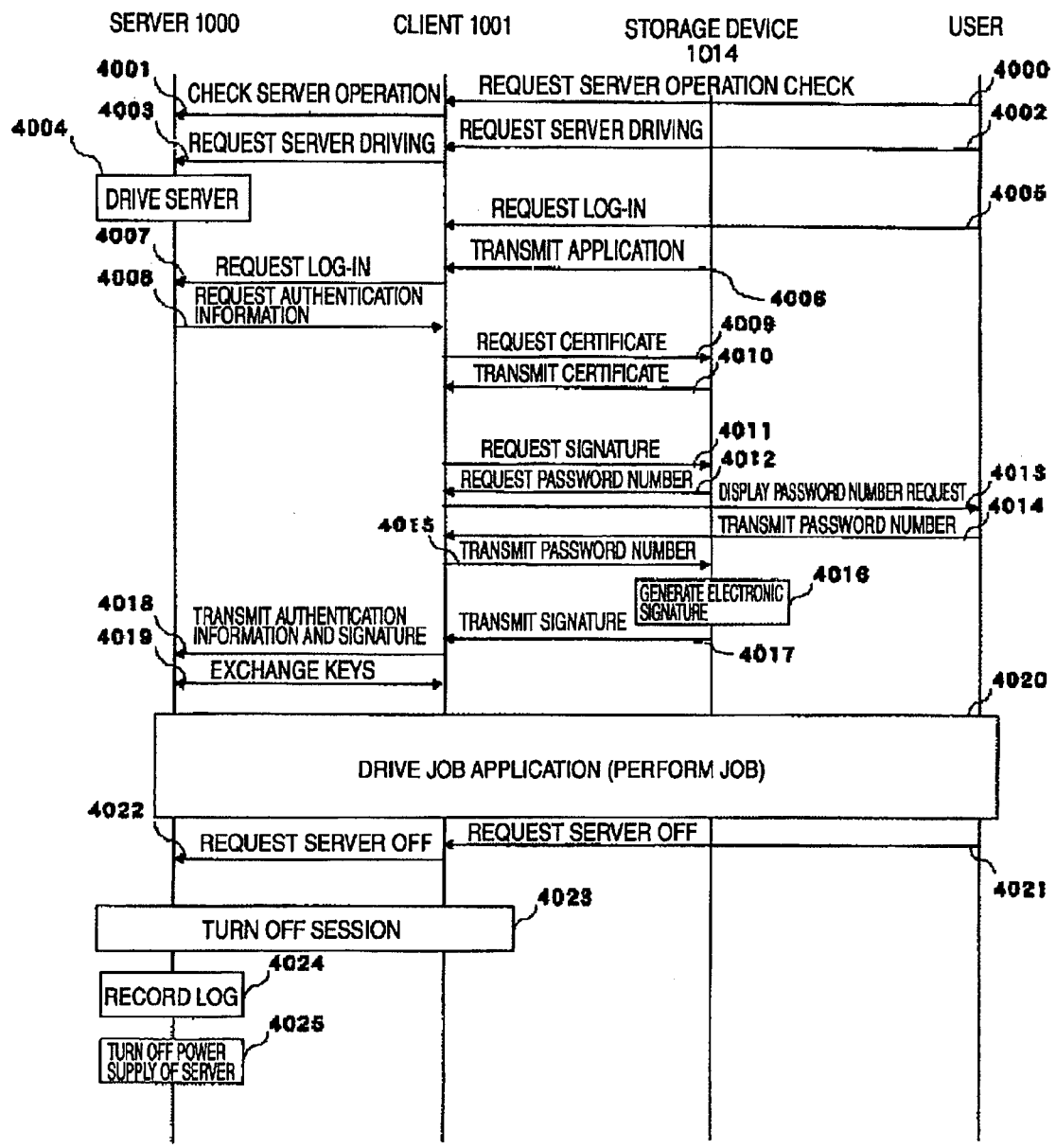
FIG. 5 is a diagram illustrating the details of communications among user, storage device, client and server in the first embodiment of the present invention.
Figure 6:
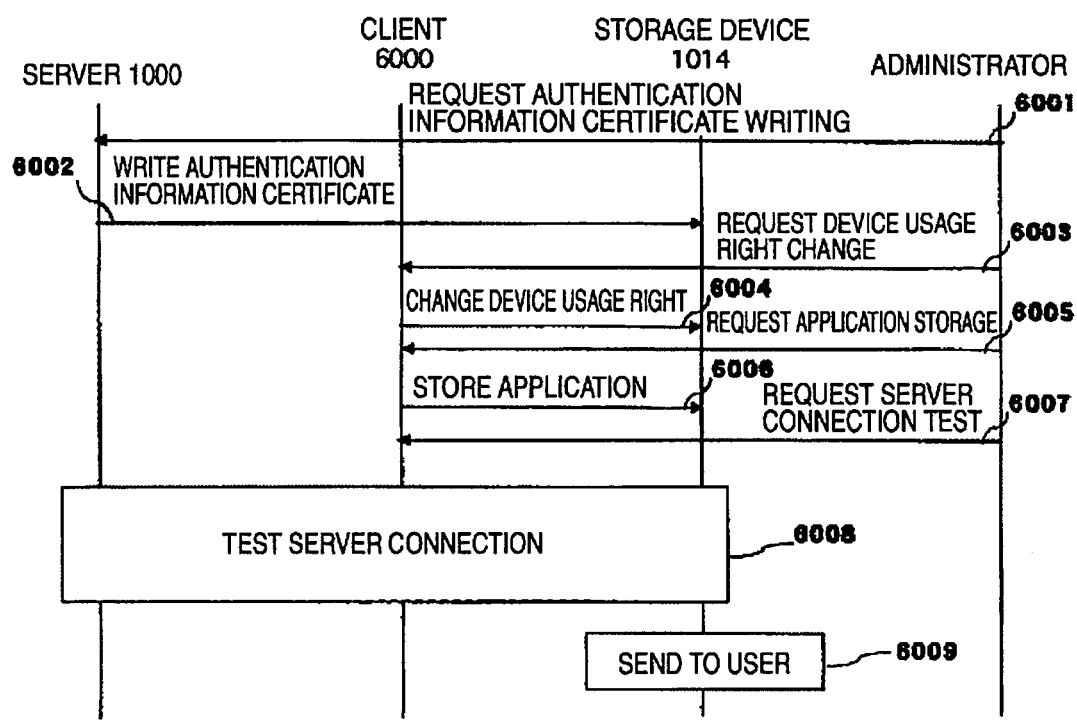
FIG. 6 is a diagram for explaining the initialization of the storage device by an administrator in the first embodiment of the present invention.
Figure 7:
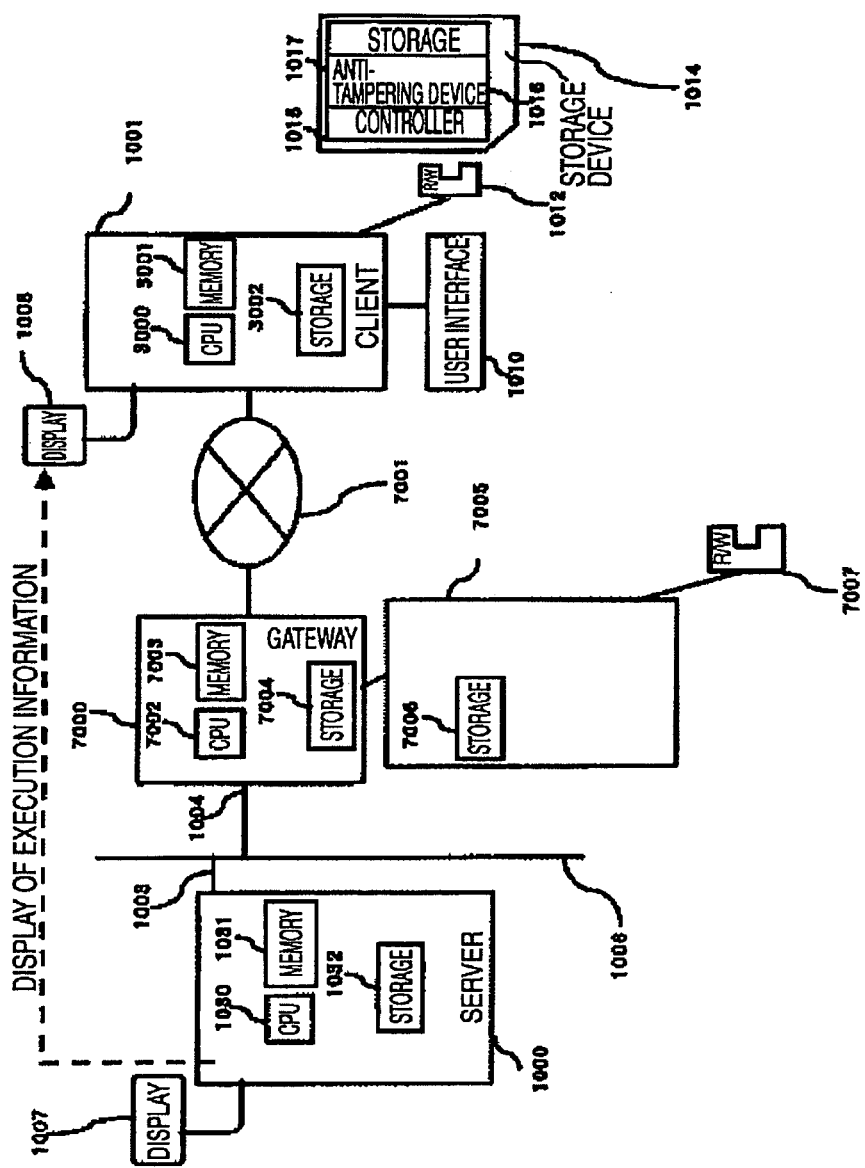
FIG. 7 is a diagram illustrating a remote access system as a second embodiment of the present invention.
Figure 8:
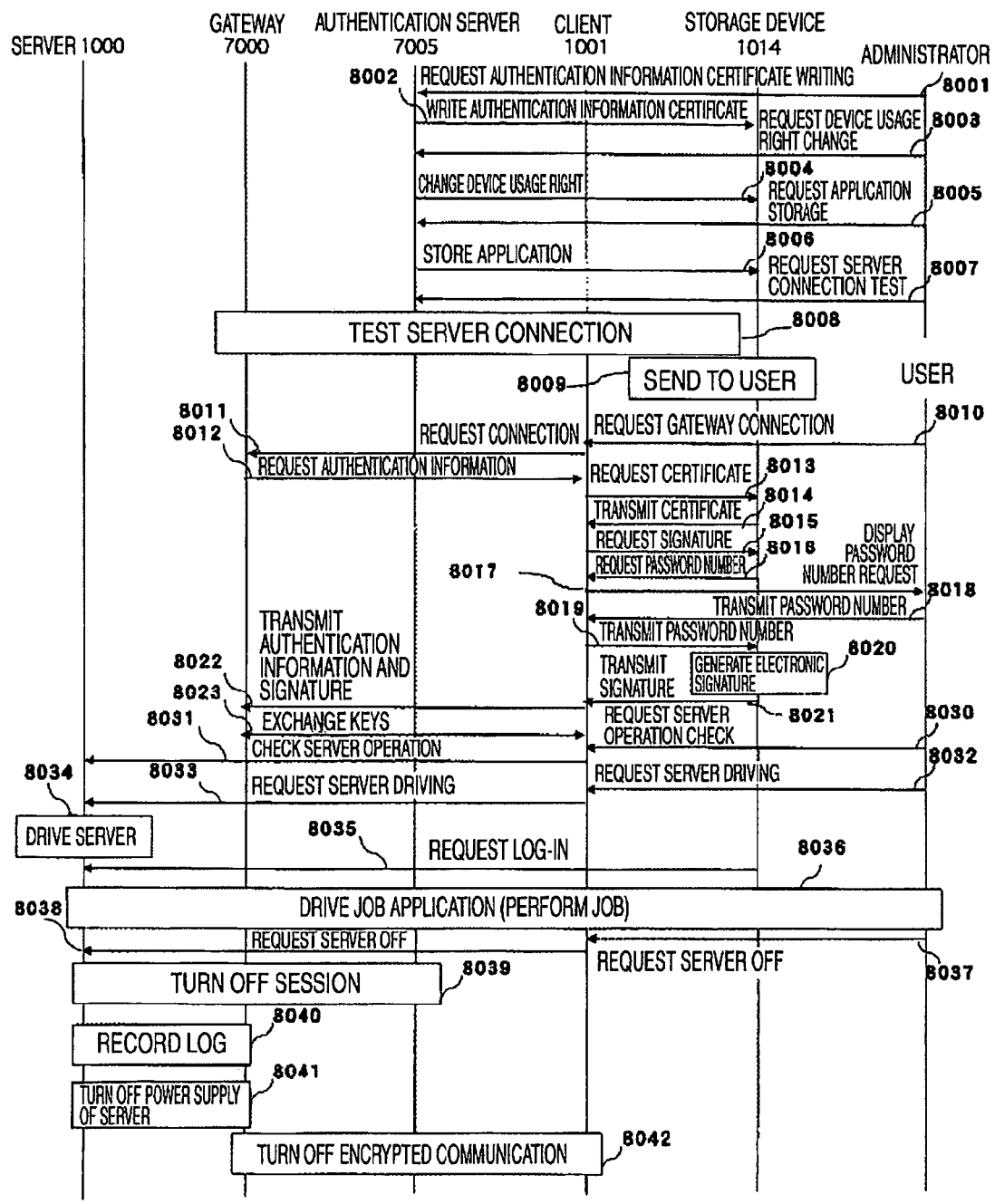
FIG. 8 is a diagram illustrating the details of communications among a user, an administrator, a storage device, a client, a gateway, and a server in the second embodiment of the present invention.
Figure 9:
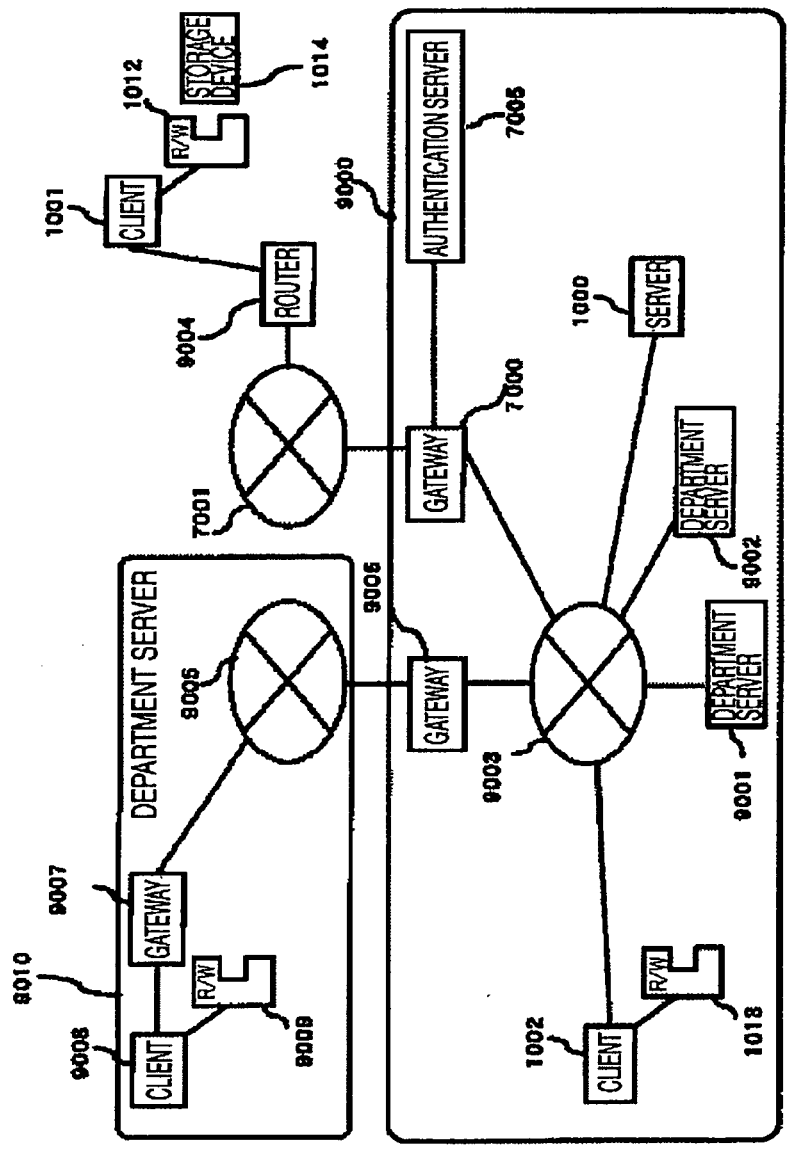
FIG. 9 is a block diagram illustrating a structure of the network of the remote access system in the second embodiment of the present invention.
Figure 10:
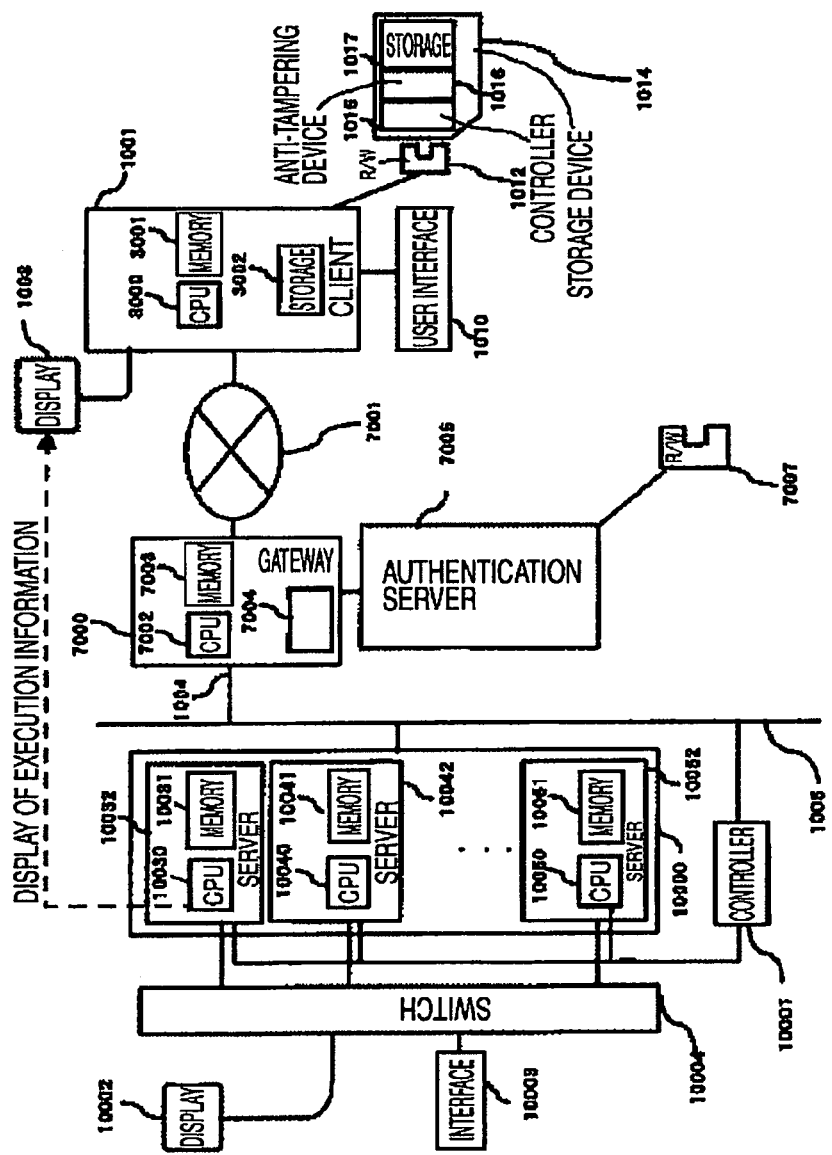
FIG. 10 is a diagram illustrating a remote access system as a third embodiment of the present invention.
Figure 11:
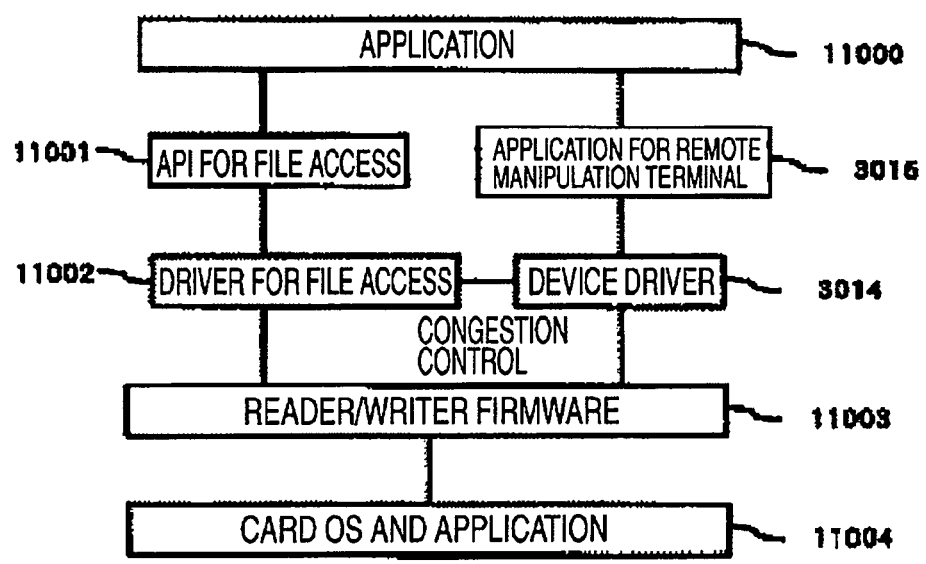
FIG. 11 is a diagram illustrating a software structure in the first embodiment of the present invention.
Figure 12:
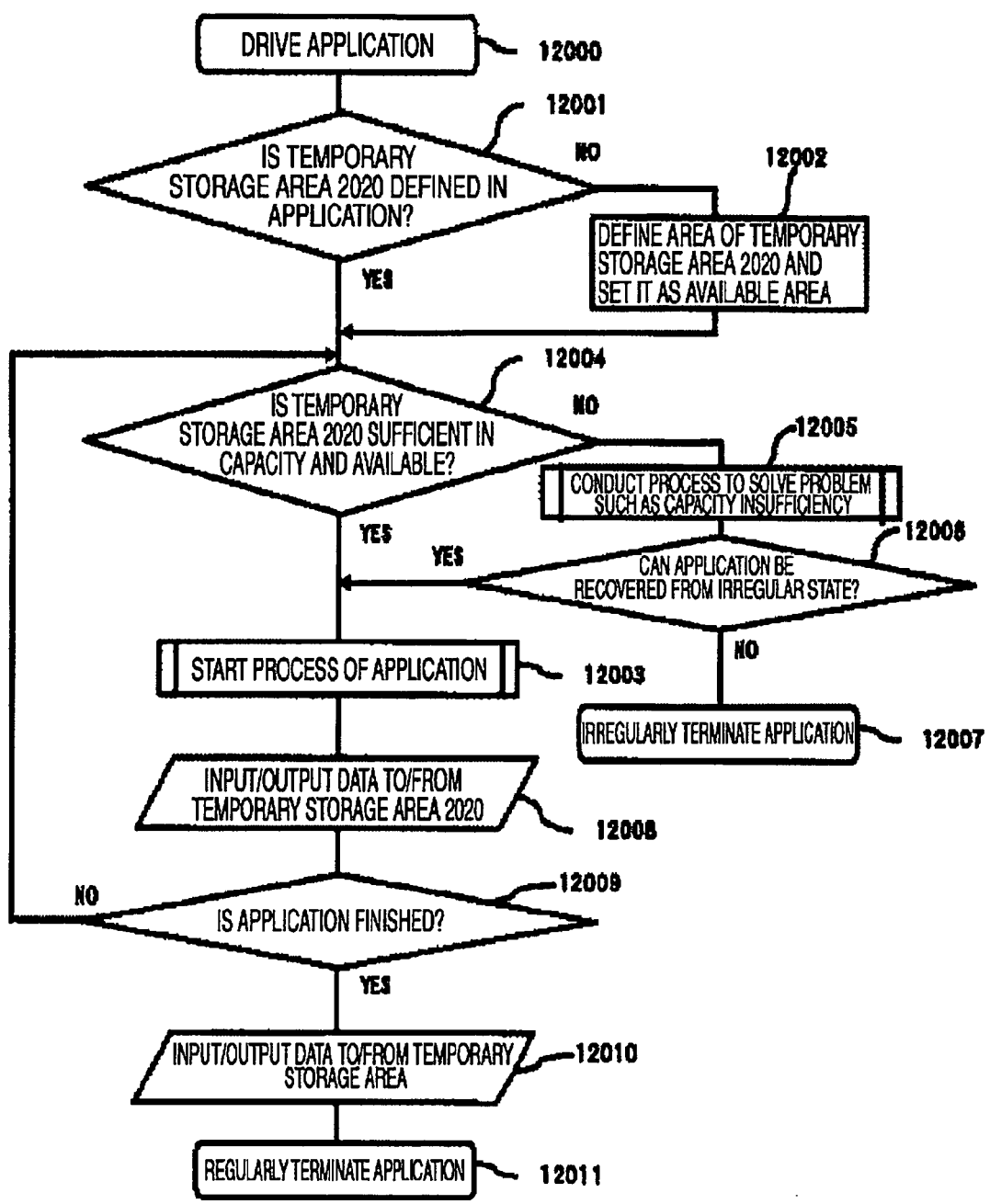
FIG. 12 is a flowchart illustrating a processing method for utilizing a temporary storage area from an application in the first embodiment of the present invention.
Figure 13:
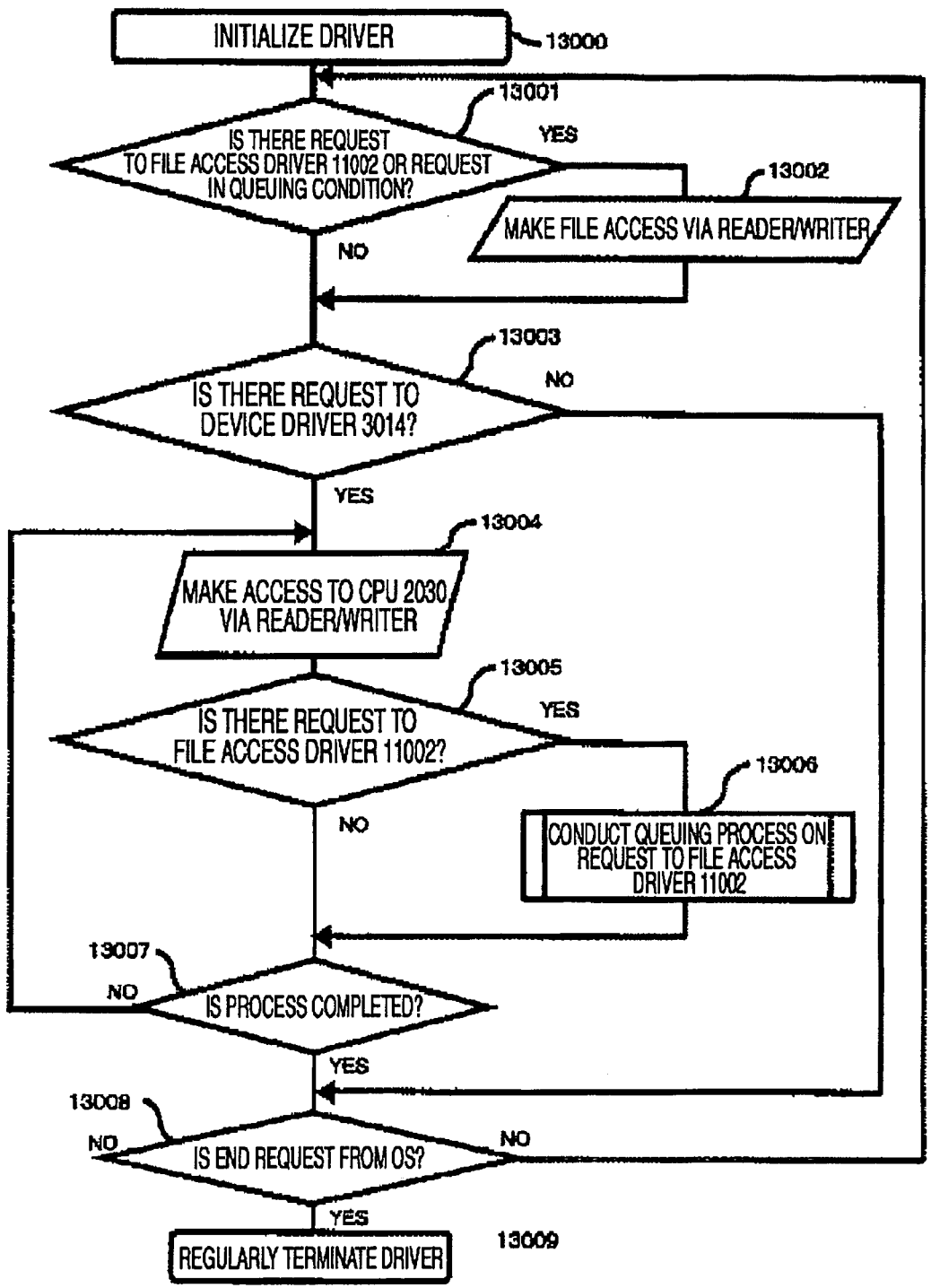
FIG. 13 is a flowchart illustrating a processing method for conducting congestion control in a driver in the first embodiment of the present invention.
Figure 14:
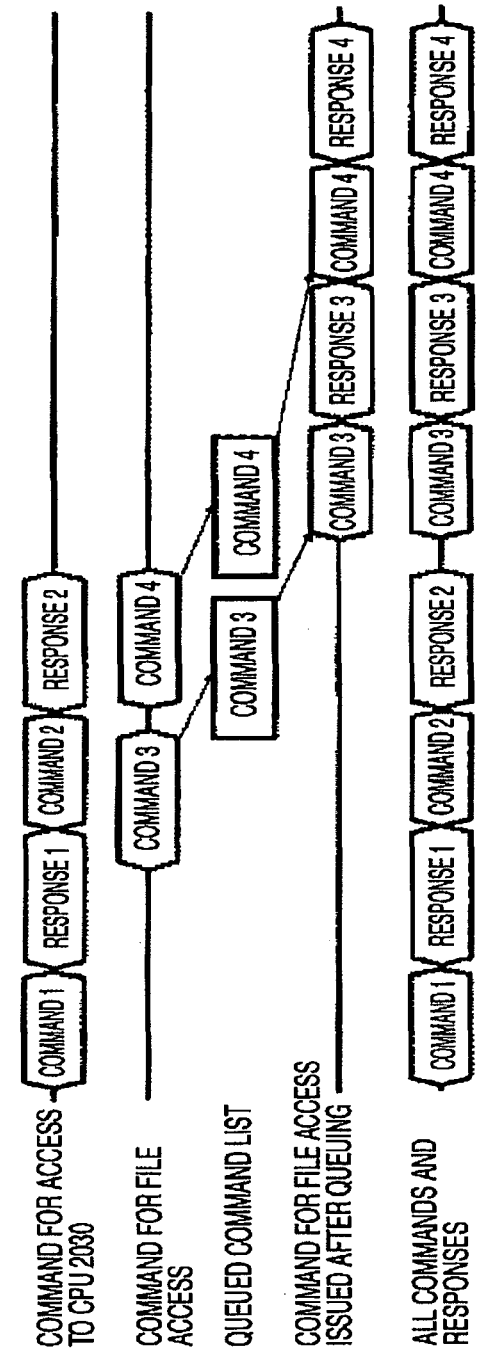
FIG. 14 is a time chart illustrating congestion control in the driver in the first embodiment of the present invention.
Figure 15:
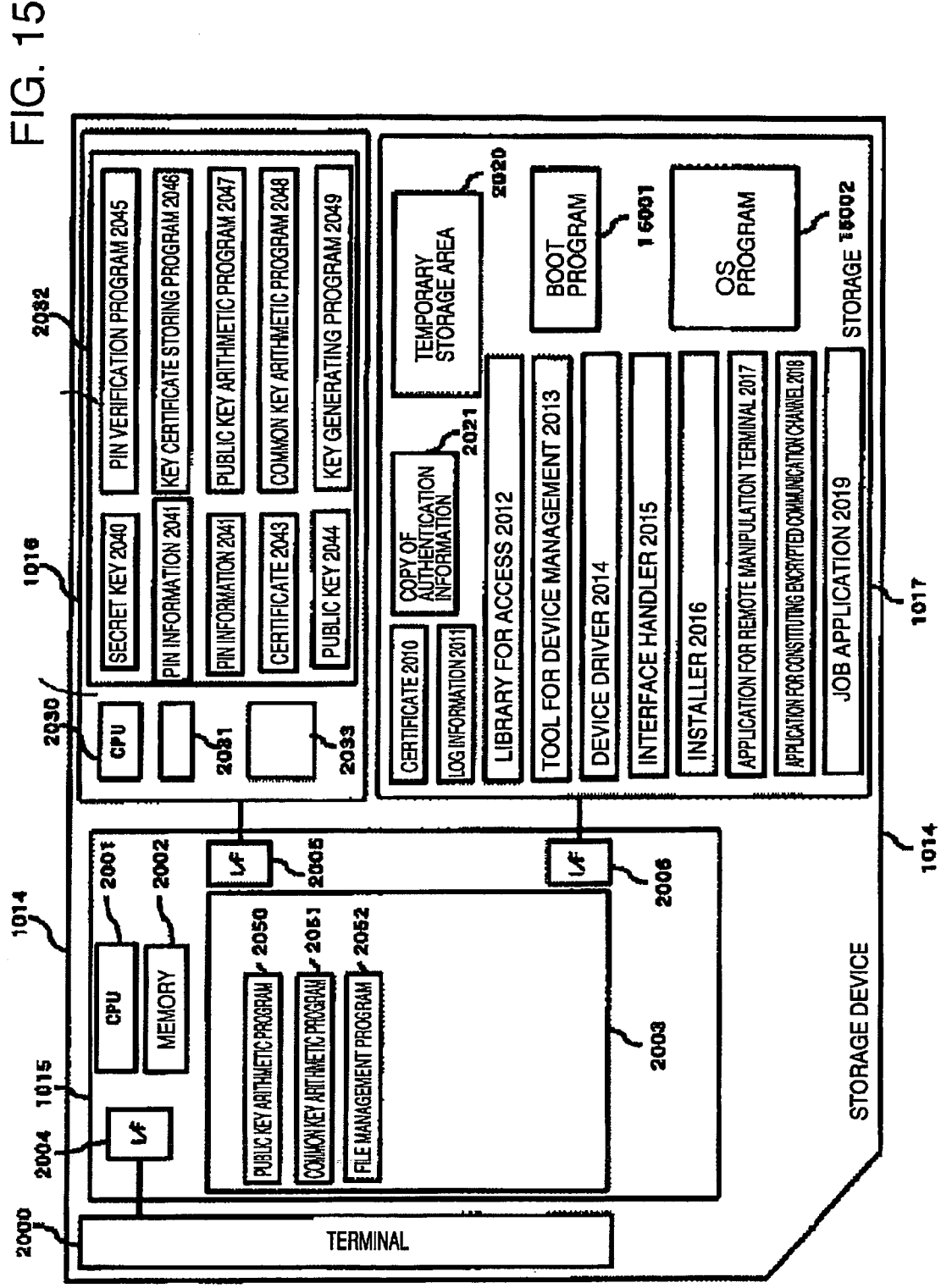
FIG. 15 is a block diagram for explaining a storage device as a fourth embodiment of the present invention.
Figure 16:
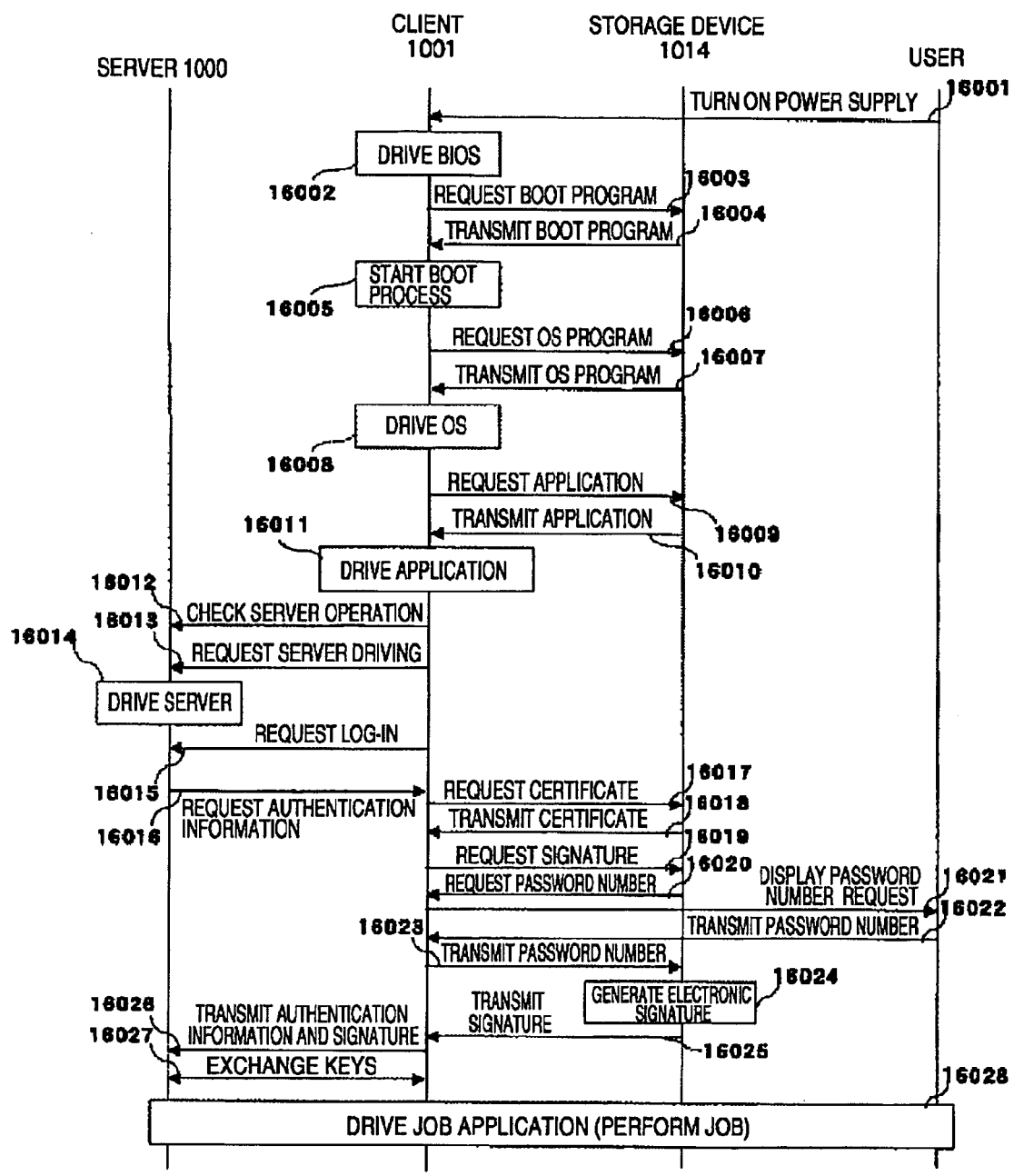
FIG. 16 is a diagram illustrating the details of communications among a user, a storage device, a client, and a server in the fourth embodiment of the present invention.
Figure 17A:
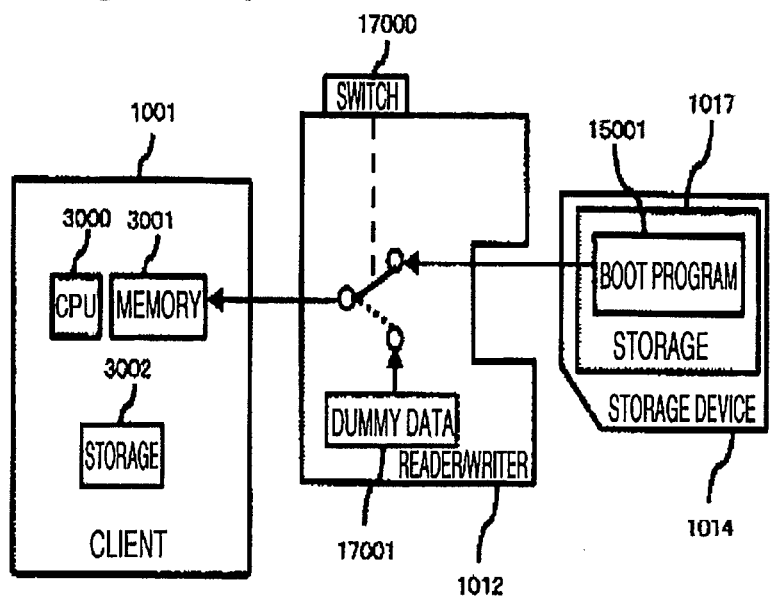
FIG. 17A is a diagram illustrating processes conducted among a storage device, a reader/writer and a client as a fifth embodiment of the present invention.
Figure 17B:
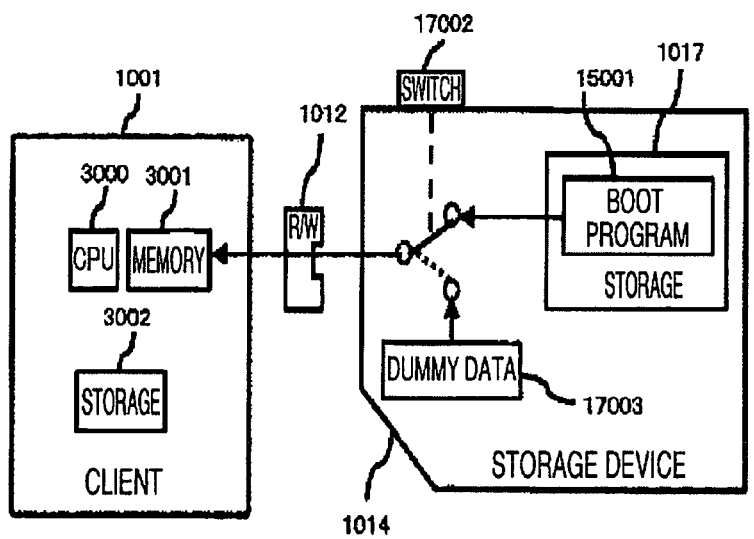
FIG. 17B is a diagram illustrating processes conducted among a storage device, a reader/writer, and a client in the fifth embodiment of the present invention.
Figure 17C:
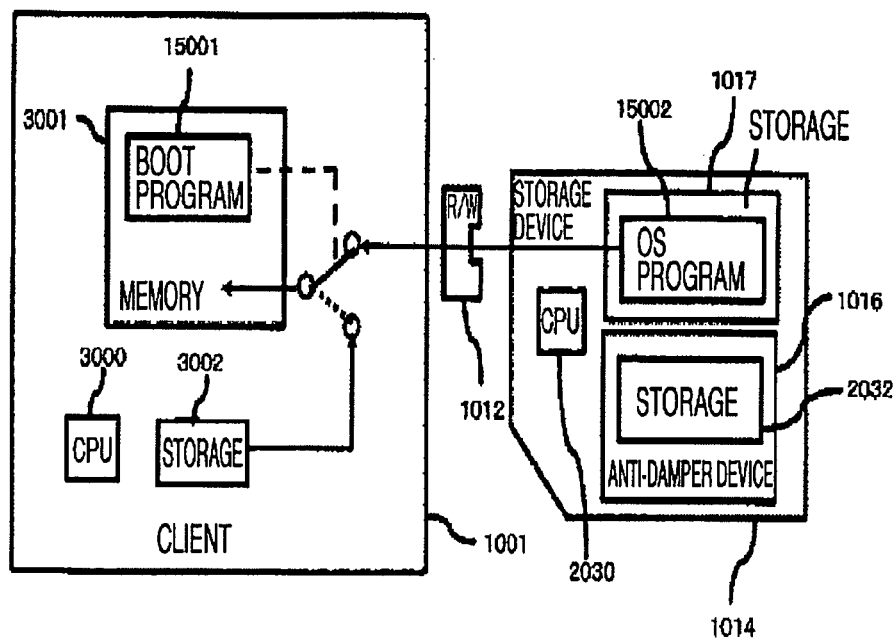
FIG. 17C is a diagram illustrating processes conducted among a storage device, a reader/writer, and a client in the fifth embodiment of the present invention.
Figure 18:
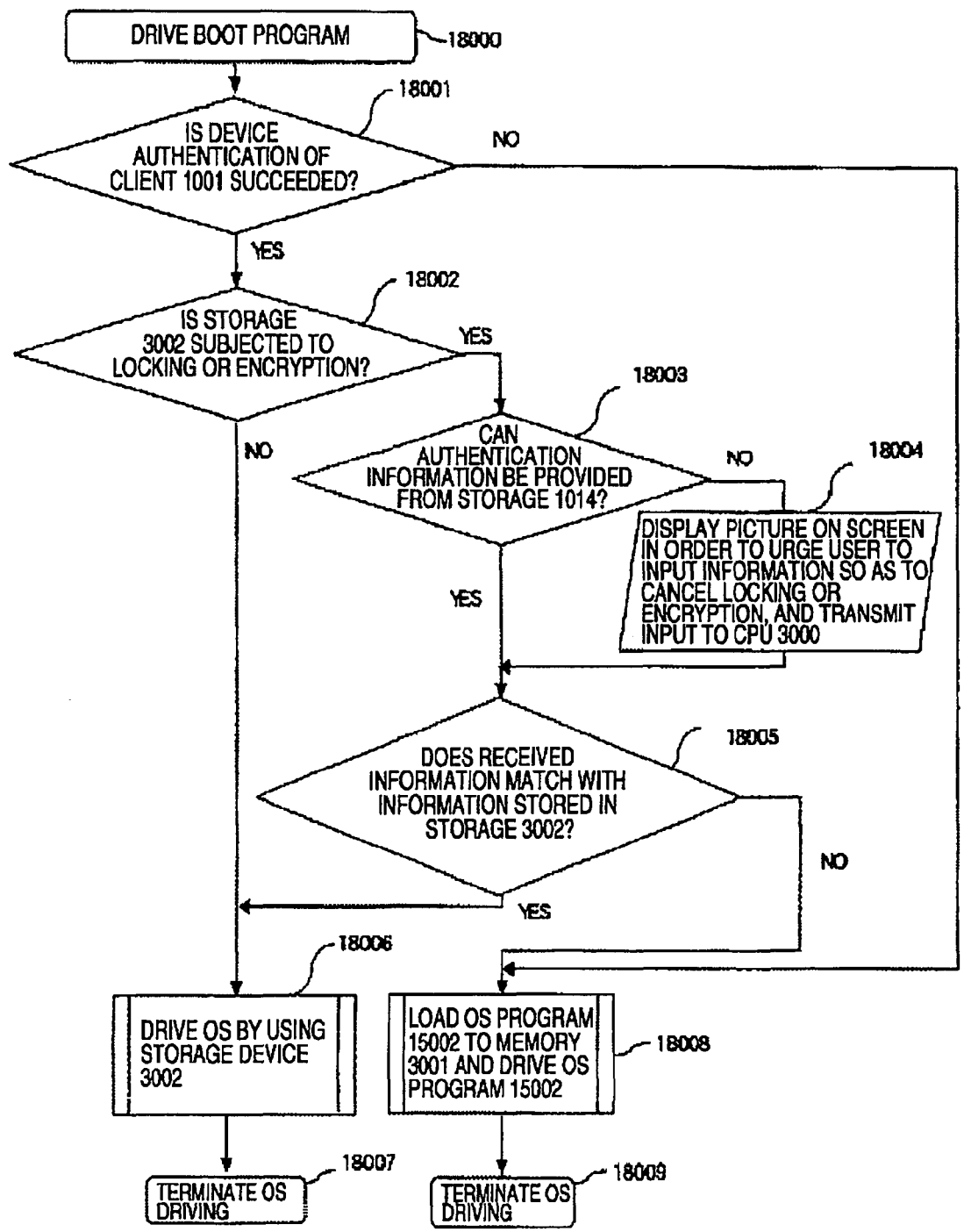
FIG. 18 is a flowchart for explaining operations when an OS is driven in the fifth embodiment of the present invention.

The invention claimed is:

1. An external device, positioned in a secure remote access system, including a storage unit, the storage unit including an anti-tampering storage unit, connected to a client device through a connecting member,
wherein the storage unit stores:
(1) authentication information,
(2) a boot program, wherein when it is determined the boot program is requested, the boot program is to be:
(2)-A transmitted from a transmitting device of the external device to the client device,
(2)-B loaded into a memory including a non-volatile memory within the client device, and
(2)-C performed by a CPU within the client device, for controlling the client device to receive an OS program from the external device, wherein the boot program controls the external device to perform an authentication operation of the client device prior to reception operation of the OS program, and wherein when it is determined the boot program is not requested a dummy data will be transmitted from the transmitting device of the external device to the client device;
(2)-1 the OS program is to be:
(2)-1A transmitted from the transmitting device of the external device to the client device,
(2)-1B loaded into the memory within the client device
(2)-1C performed by the CPU within the client device, and controlling the client device to receive a remote manipulation program from the external device,
(2)-2 the remote manipulation program is to be:
(2)-2A transmitted from the transmitting device of the external device to the client device,
(2)-2B loaded into the memory within the client device, and
(2)-2C performed by the CPU within the client device, reading address information where the client device accesses a server via a network, accessing the server based on the address information, checking operation of the server, turning on a power supply of the server if operation of the server cannot be checked, and controlling the client device to receive the authentication information using an identification information acquired from an operator of the external device, to establish a communication path between the client device and a server device to be connected to the client device via a network, and to remotely control the server device.

2. The external device according to claim 1, wherein the authentication information includes a key information regarding an establishment of the communication path.

3. The external device according to claim 1, wherein the authentication information received at the client device comprises an electric signature prepared by the external device according to the authentication information stored in the storage unit.

4. The external device according to claim 1, wherein the storage unit further includes a device driver for the boot program, the boot program being transmitted from the transmitting device to the client device, loaded into a memory within the client device, and performed by a CPU within the client device.

5. The external device according to claim 1, wherein a reception operation of the OS program is performed in response to failure of an authentication of the client device.

6. The external device according to claim 5, wherein the authentication comprises a verification operation of an inherent identifier of a component within the client device.

7. The external device according to claim 5, wherein the boot program further controls the external device to examine whether or not the storage unit has been ciphered or locked with a password in response to success of the authentication, to receive release information for the ciphered or locked if the storage unit has been ciphered or locked and to receive the OS program in response to failure of release of the storage unit having been ciphered or locked with the password.

8. The external device according to claim 6, wherein the component is selected from a group including a CPU, a memory, a storage unit or a network card.

9. The external device according to claim 6, wherein the inherent identifier of the component is selected from a group including a manufacturing number or a MAC address.

10. The external device according to claim 7, wherein the boot program controls the client device to perform the OS program in response to either successful authentication of the client device or release of the ciphered or locked storage unit.

11. An external device, positioned in a secure remote access system, including both a storage unit connected to a client device through a connecting member and a switching member for judging whether a boot program having been stored in the storage unit is to be transmitted to the client device,
wherein the storage unit stores:
(1) authentication information, wherein the boot program is to be:
(2)-A transmitted from a transmitting device of the external device to the client device,
(2)-B loaded into a memory within the client device in response to a positive judgment by the switching member, and
(2)-C performed by a CPU within the client device, for controlling the client device to receive a first OS program from the external device,
(2)-1 the first OS program is to be:
(2)-1A transmitted from the transmitting device of the external device to the client device, and
(2)-1B loaded into the memory within the client device in response to the positive judgment by the switching member, (2)-10A wherein the client device stores a second OS program operable in accordance with a dummy data to be transmitted to the client device in response to a negative judgment by the switching member, and (2)-10B wherein either one of the first or second OS program operable in the client is performed by a CPU within the client device for controlling the client device to receive a remote manipulation program from the external device, (2)-2 the remote manipulation program is to be:

(2)-2A transmitted from the transmitting device of the external device to the client device, (2)-2B loaded into a memory within the client device, and (2)-2C performed by a CPU within the client device, reading address information where the client device accesses a server via a network, accessing the server based on the address information, checking operation of the server, turning on a power supply of the server if operation of the server cannot be checked, and controlling the client device to receive authentication information using an identification information acquired from an operator of the external device, to establish a communication path between the client device and a server device to be connected to the client device via a network, and to remotely control the server device.

12. The external device according to claim 11, wherein the identification information is selected from a group including a personal identification number, a pass word, a pass phrase, a one-time pass word and a human-body identification of the operator.

\* \* \* \* \*